United States Patent [19]

Barzel

[11] Patent Number: 5,699,491
[45] Date of Patent: Dec. 16, 1997

[54] PRINTER DRIVER HAVING GAMUT-MAPPED COLORS

[75] Inventor: Ron Barzel, Bellevue, Wash.

[73] Assignee: Canon Information Systems, Inc., Costa Mesa, Calif.

[21] Appl. No.: 490,557

[22] Filed: Jun. 15, 1995

[51] Int. Cl.⁶ .............................. G06K 15/00; G03F 3/08; H04N 1/46
[52] U.S. Cl. .................. 395/109; 358/518; 358/520; 358/525; 358/523
[58] Field of Search ........................ 395/109, 101, 395/115; 358/520, 519, 518, 523–525, 515, 504, 501; 345/199, 154; 382/167

[56] References Cited

U.S. PATENT DOCUMENTS

| 5,185,661 | 2/1993 | Ng ............................. | 358/75 |
| 5,299,291 | 3/1994 | Ruetz ......................... | 395/109 |
| 5,323,249 | 6/1994 | Liang ......................... | 358/518 |
| 5,438,649 | 8/1995 | Ruetz ......................... | 395/109 |
| 5,450,216 | 9/1995 | Kasson ....................... | 358/518 |
| 5,500,921 | 3/1996 | Ruetz ......................... | 395/109 |
| 5,539,540 | 7/1996 | Spaulding et al. .......... | 358/520 |

OTHER PUBLICATIONS

M. Stone, et al., "Color Gamut Mapping and the Printing of Digital Color Images", ACM Transactions on Graphics, vol. 7, No. 4, Oct. 1988, pp. 249–292.

K. Spaulding, et al., "UltraColor: A new gamut mapping strategy" SPIE vol. 2414, pp. 61–68.

*Primary Examiner*—Dwayne Bost
*Assistant Examiner*—Tracy M. Legree
*Attorney, Agent, or Firm*—Fitzpatrick, Cella, Harper & Scinto

[57] ABSTRACT

A color printer driver for a printer includes a reproduction look-up table (LUT) which stores CMY values for colors both in-gamut and out-of-gamut of the printer. For close-in out-of-gamut colors, the reproduction LUT stores perceptually matched CMY values whereas for far-out-of-gamut colors, the reproduction LUT stores saturation matched CMY values. CMY values for the out-of-gamut colors are obtained by a dual-cone gamut mapping technique in which an actual cone of N-cone arranged surfaces is defined so as to mimic the actual gamut of the printer, an ideal cone of M-cone arranged surfaces is defined so as to mimic an ideal gamut such as the gamut of a typical color monitor, a target out-of-gamut color is projected onto the actual cone and de-saturated until an in-gamut CMY value is obtained, the same target color is projected onto the ideal cone to obtain a fully-saturated CMY value, and a weighted average is obtained of the in-gamut CMY value and the fully-saturated CMY value, the weight being based on a measure of distance between the out-of-gamut target color and its projection onto the actual cone.

39 Claims, 27 Drawing Sheets

PRINTER DRIVER HAVING GAMUT-MAPPED COLORS

BACKGROUND OF THE INVENTION

1. Field of the Invention

The present invention pertains to a method and apparatus for building and using, in a printer driver or color management system, color look-up tables which determine the colors that the printer driver sends to a color printer in response to requests to print specific colors. The specific colors requested to be printed may include colors that are not printable, i.e., are not in the gamut of the color printer. For those colors in particular, the invention provides for gamut mapping of the unprintable colors to printable colors in such a way as to preserve both perceptual color reproduction and saturation color reproduction.

2. Description of the Related Art

Recently, as the availability of color monitors and color printers has increased, it is more and more commonplace for a computer user to create a full color image on a color monitor, such as by using desktop publishing software, and then to request a full color printout of that image on a color printer.

However, color printers and color monitors form color images differently. Specifically, a color monitor is a light emitting device; colors are formed on color monitors by additive light processing in which light from three color primaries, generally red, green and blue, are added. Printed images, on the other hand, simply reflect ambient light; colors are formed by subtractive light processing according to the way ambient light is affected by three subtractive primaries, generally cyan, magenta and yellow (and sometimes black).

Additive light processing and subtractive light processing are fundamentally different. As a result, the range of colors displayable on a monitor is different from the range of colors printable by a printer. FIG. 1 is the CIE 1931 chromaticity diagram showing the range (or "gamut") of colors displayable by a monitor (area "A") and the range (or "gamut") of colors printable by a printer (area "B"). As seen in FIG. 1, the range of colors displayable on a monitor is generally greater than the range of colors printable by a printer. This is because a monitor is a light emitting device and is able to display colors with greater saturation. There are, however, some low saturation areas such as at area 10 where a printed image, which is light-subtractive, has greater color range than a monitor.

Because of the difference between the gamuts of printable and displayable colors, it has heretofore been difficult to print color images which are perceived as faithful reproductions of displayed color images. Specifically, it is simply not possible to print a color in areas like out-of-gamut area 11 which are outside the range "B" of printable colors. Accordingly, even though those colors may be seen on color monitors, they cannot be printed on a color printer.

U.S. Pat. No. 5,299,291, which is assigned to the assignee of the present invention and the contents of which are incorporated herein by reference as if set forth in full, describes a system which maps out-of-gamut colors to printable colors. In the system of the aforesaid U.S. Pat. No. 5,299,291, out-of-gamut colors are adjusted to printable colors within the printer gamut by building printer tables which produce colors which vary smoothly in the out-of-gamut regions and which exhibit monotonic increases in lightness. A warping process is utilized so as to compensate for the so-called "Abney effect", in which two identically-hued colors are perceived by a viewer as colors with different hues because of differences in color saturation. The system in this aforesaid U.S. Pat. No. 5,299,291 produces good results from a perceptual standpoint, meaning that viewers who view a printed color and a displayed color will generally perceive those colors as being the same. Accordingly, the gamut mapping system in U.S. Pat. No. 5,299,291 is sometimes referred to as "perceptual matching".

Room for improvement, however, is needed in an area known as "saturation matching". Specifically, especially in business-oriented computer-generated graphics, fully-saturated colors are often used to depict graphics such as bar charts, pie graphs, emphasis lines, and the like. Using perceptual matching techniques will generally print a color that is perceived to be the same as that displayed, but the printed color will no longer be saturated. Ordinarily, this is undesired since the viewer, in such business-graphic applications, generally desires to print a fully-saturated color even if that color is not exactly the same hue as that of the color that is displayed. Such as process is known as "saturation matching", meaning that saturated colors on a display should be printed as saturated colors, even if the color hues are not exactly the same.

While perceptual matching techniques have been proposed, and saturation matching techniques have also been proposed, since the goals of those two matching techniques are different, it has heretofore been difficult to realize both of those goals in the same system. Accordingly, a need exists for a system which provides good perceptual matching for relatively unsaturated colors, while at the same time providing good saturation matching for highly saturated colors.

SUMMARY OF THE INVENTION

The present invention addresses the above-noted need by providing a system which provides good perceptual matching for relatively unsaturated colors, while at the same time providing good saturation matching for highly saturated colors. According to the invention, for an out-of-gamut target color, the target color is projected onto two different surfaces in a color coordinate system such as HLS coordinates. The first surface is referred to as an "actual cone" and mimics the actual gamut of a printer. The second surface is referred to as an "ideal cone" and mimics an ideal gamut such as the gamut of a color monitor. The projection onto the actual cone is de-saturated until an in-gamut CMY value is obtained; this value represents a good "perceptual match" between the out-of-gamut target color and the printable color. The projection onto the ideal cone gives an in-gamut CMY value which represents a good "saturation match" between the target color and the printable color. A weighted average between the two CMY values is then obtained based on the distance from the target color to its projection onto the actual cone, thereby resulting in a printable color which is a good perceptual match for relatively unsaturated colors and which is a good saturation match for relatively saturated colors.

Thus, according to one aspect of the invention, a color printer driver for a printer includes a reproduction look-up table (LUT) which, for each of plural colors both in-gamut and out-of-gamut of the printer,-stores color component values for printing by the printer. Means, responsive to a command to print a color, are provided for outputting color component values stored in the reproduction LUT in correspondence to the commanded color. For close-in out-of-gamut colors, the reproduction LUT stores perceptually matched color component values while for far-out-of-gamut colors, the reproduction LUT stores saturation matched color component values. For out-of-gamut colors between close-in out-of-gamut colors and far-out-of-gamut colors, the reproduction LUT stores weighted averages between a perceptual match and a saturation match.

In a further aspect of the invention, a color printer driver which outputs color component values for printing by a printer includes a reproduction look-up table (LUT) which, for each of plural colors both in-gamut and out-of-gamut of the printer, stores color component values for printing by the printer. Means, responsive to a command to print a color, are provided for outputting color component values stored in the reproduction LUT in correspondence to the commanded color. For out-of-gamut colors, the reproduction LUT stores color component values obtained by dual-cone gamut mapping in which an actual cone of N-cone arranged surfaces is defined which mimics an actual gamut of the printer, in which an ideal cone of M-cone arranged surfaces is defined which mimics an ideal gamut, in which a target out-of-gamut color is projected onto the actual cone and de-saturated until in-gamut color component values are obtained, in which the same target color is projected onto the ideal cone to obtain fully-saturated color component values, and in which a weighted average is obtained of the in-gamut color component values and the fully-saturated color component values, weight being based on the distance between the projection onto the actual cone and the out-of-gamut target color.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
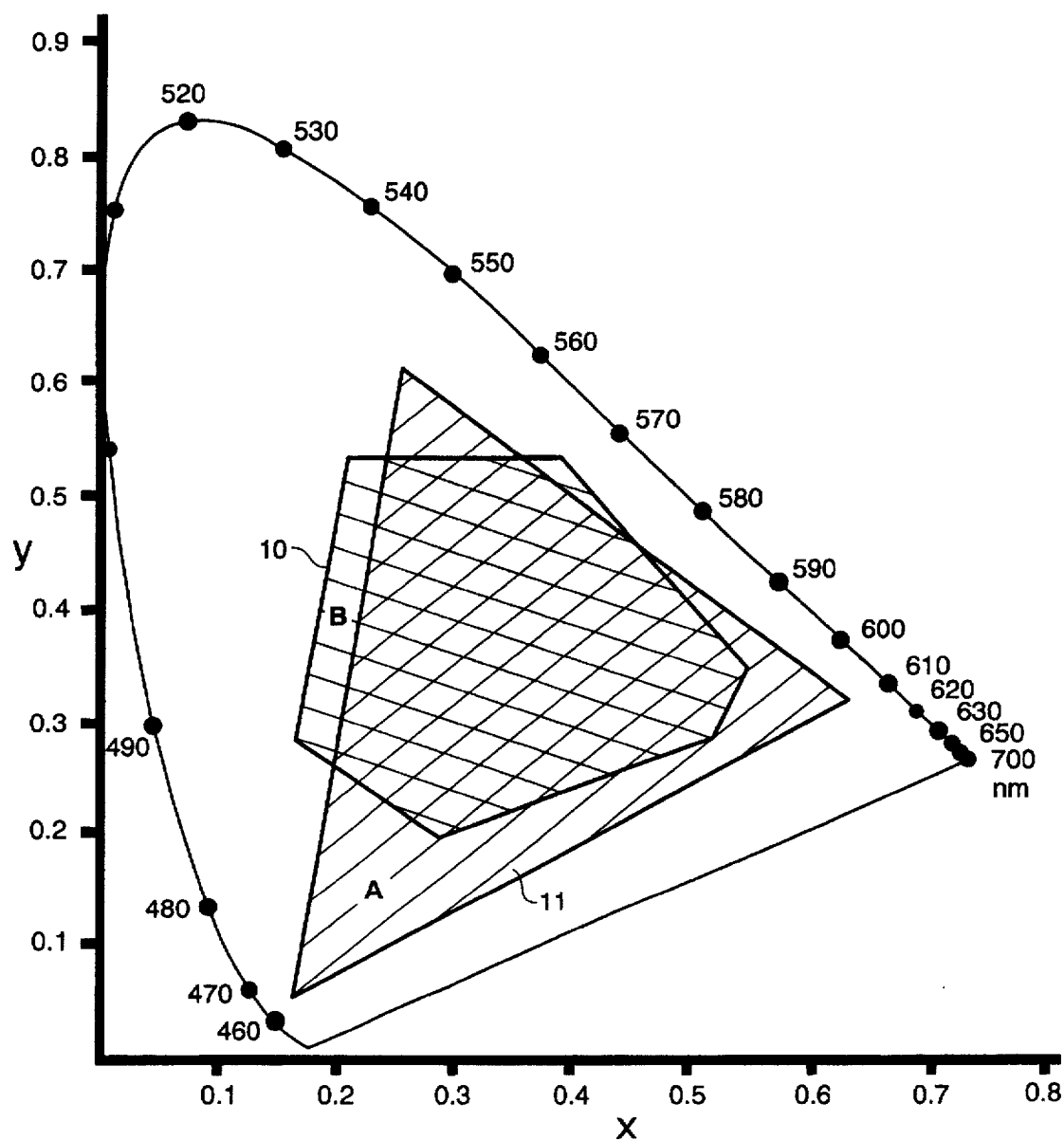
FIG. 1 is a chromaticity diagram showing how the gamut of colors printable on a printer is related to the gamut of colors displayable on a monitor.
Figure 2:
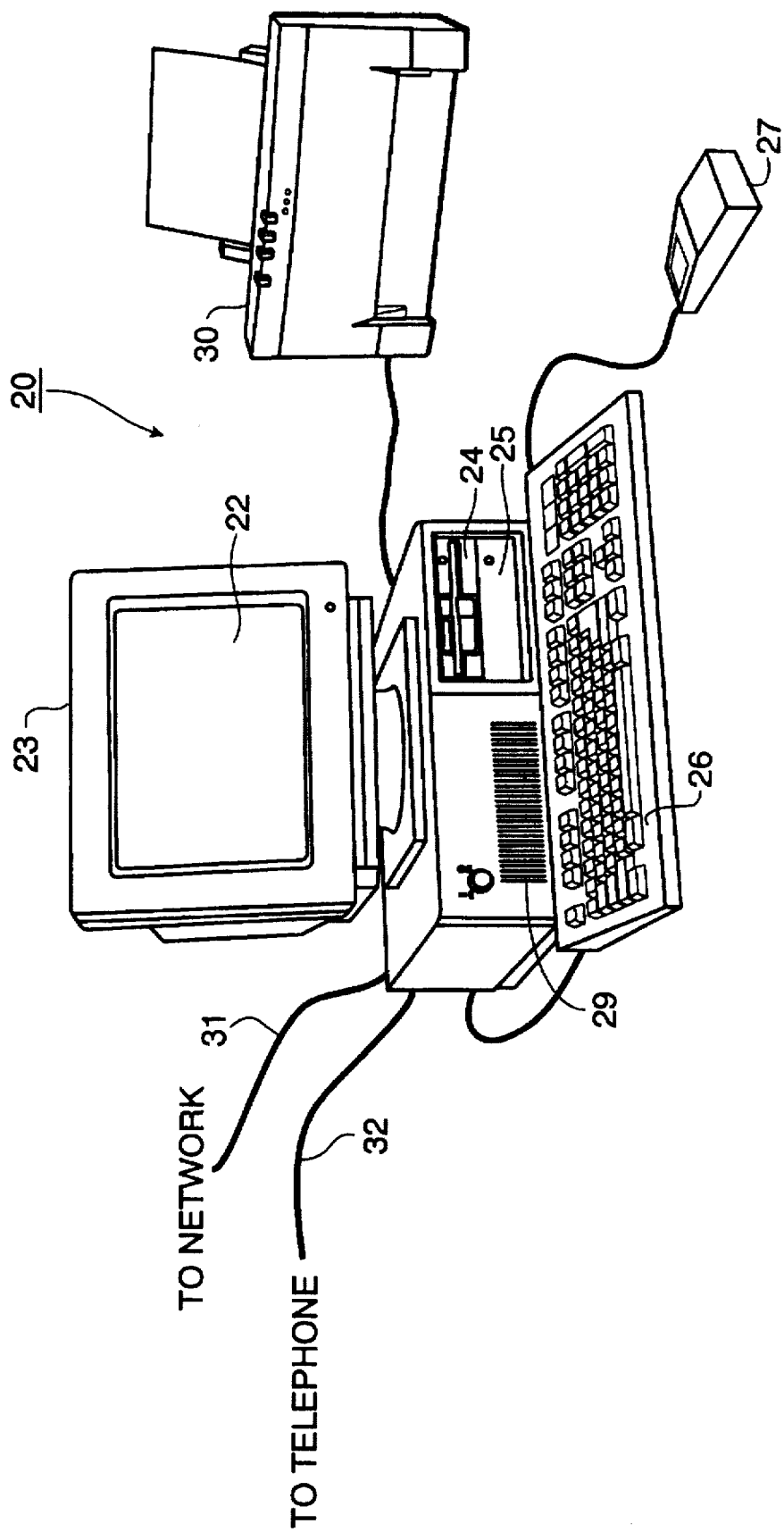
FIG. 2 is a view showing the outward appearance of representative computing equipment which incorporates a printer driver according to the invention.

FIG. 2 is a view showing the outward appearance of representative computing equipment which incorporates a printer driver according to the invention. Shown in FIG. 2 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, a pointing device 27 such as a mouse or the like which is also provided to permit manipulation of objects on display screen 22, and a combined speaker/microphone 29. A conventional color printer 30, such as a color bubble jet printer, is also provided. Also provided are connections to a network 31 or to an ordinary voice telephone line 32 for sending and receiving voice and/or facsimile messages.

While a bubble jet printer is presently preferred, any color printer which forms full color images by mixing color primaries in amounts set by corresponding color component values, such as a color laser beam printer or the like, is suitable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 3:
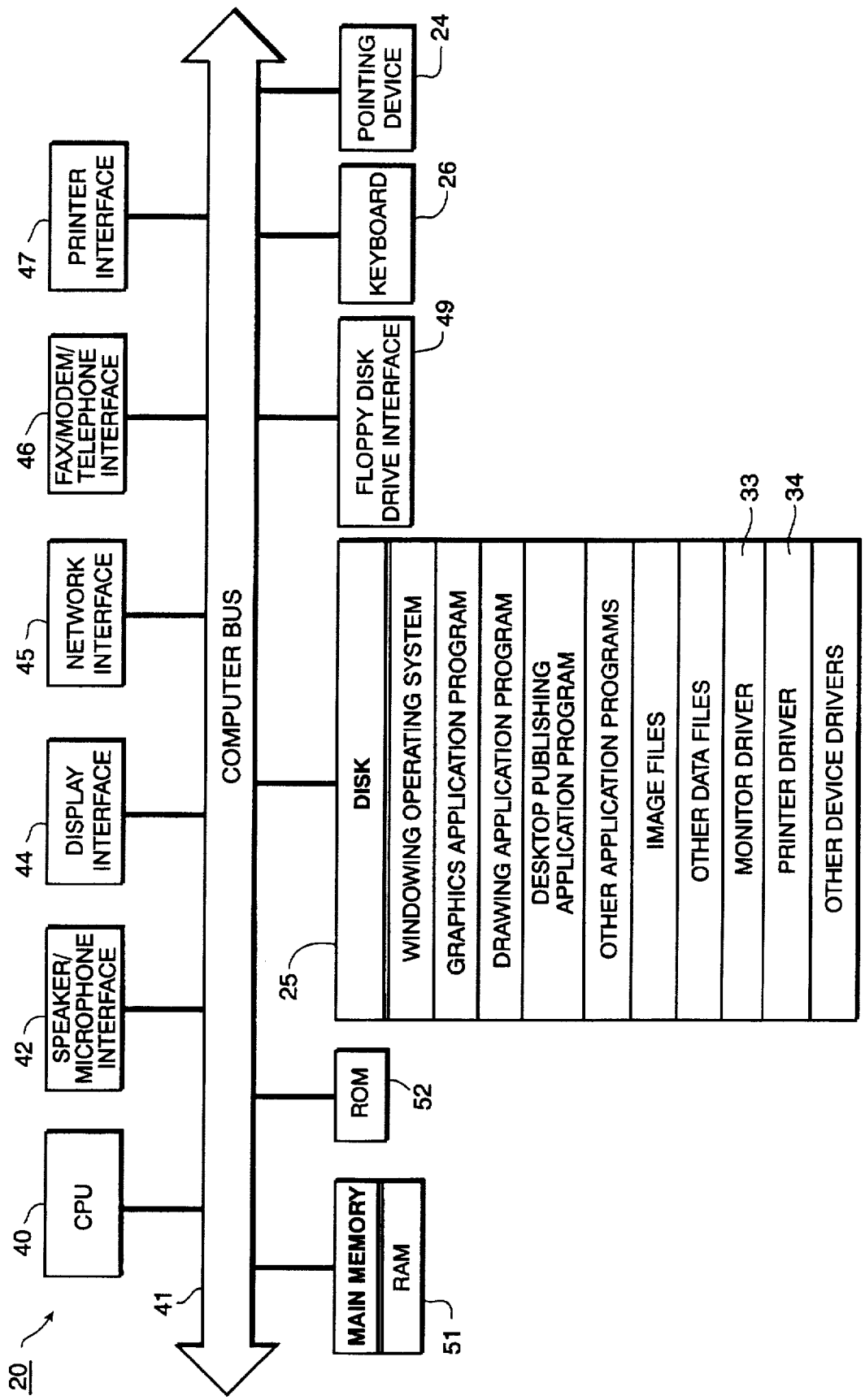
FIG. 3 is a detailed block diagram showing the internal construction of FIG. 2.

FIG. 3 is a detailed block diagram showing the internal construction of computing equipment 20. As shown in FIG. 3, computing equipment 20 includes a central processing unit (CPU) 40 such as programmable microprocessor interfaced to a computer bus 41. Also interfaced to computer bus 41 is speaker/microphone interface 42, display interface 44, network interface 45, fax/modem/telephone interface 46, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 3, and as previously mentioned, fixed disk 25 stores program instruction sequences for the windowing operating system and for various application programs such as a graphics application program, a drawing application program, a desktop publishing application program, and the like. In addition, stored on fixed disk 25 are image files such as are displayed on monitor 23 or printed on printer 30 under control of a designated application program. Fixed disk 25 also stores a monitor driver which controls how RGB color primary values are provided to display interface 44, and printer driver 34 which controls how CMY color component values are provided to printer interface 47 for printout by printer 30. Other device drivers are also stored on fixed disk 25, for providing appropriate signals to the various devices (such as the speaker and the microphone and the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of printer driver 34 is stored. The user would then install printer driver 34 onto disk 25 by inserting the purchased floppy disk into floppy disk drive 24 and by commanding CPU 40 to copy printer driver 34 from the floppy disk onto disk 25. It is also possible for the user, via modem interface 46, to download printer driver 34 from a computerized bulletin board to which the drivers had previously been uploaded.

Figure 4:
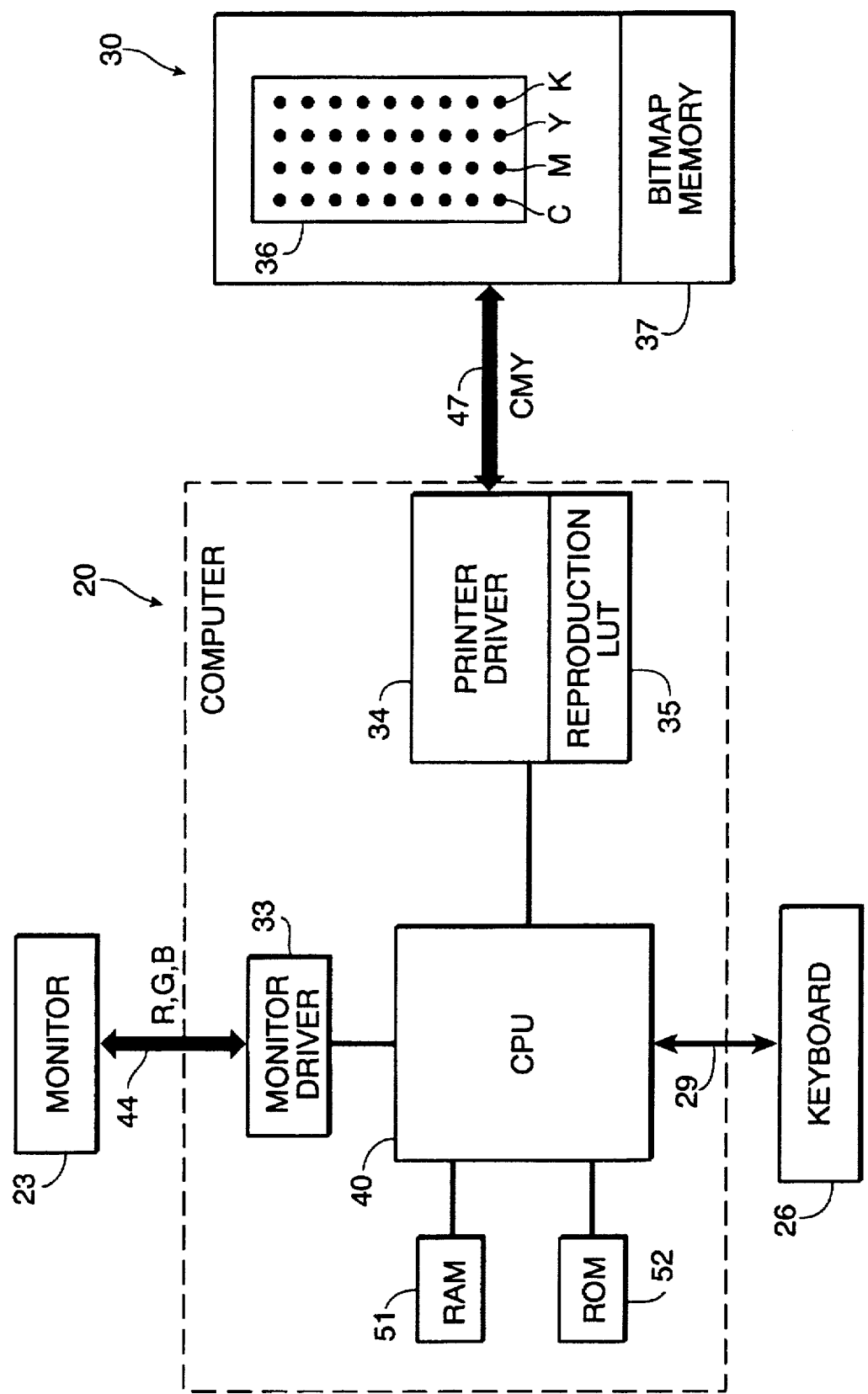
FIG. 4 is a functional block diagram which stresses functional connectivity of the FIG. 3 block diagram.

FIG. 4 is a functional block diagram showing how computer 20 interacts with monitor 23 and printer 30. Shown in FIG. 4 are computer 20 with monitor driver 33, printer driver 34, CPU 40, RAM 51 and ROM 52, all arranged functionally rather than in the structural arrangement shown in FIG. 3.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image for display on monitor 23. CPU provides the color image to monitor driver 33 which in turn derives RGB values for each pixel in the monitor 23. The RGB values are provided via display interface 44 to monitor 23 where those values are displayed.

Upon request, CPU 40 also feeds a color image to printer driver 34 for printing by color printer 30. Printer driver 34 derives CMY values for each pixel of the color image based on the color values provided from CPU 40. The CMY values are determined in accordance with a reproduction look-up table (LUT) 35. As will be described more fully hereinbelow, reproduction LUT 35 can accept colors which are both in-gamut for printer 30 as well as out-of-gamut for printer 30. The purpose of reproduction LUT 35 is to provide CMY values which are printable by printer 30 whether the input colors are in-gamut or out-of-gamut.

Printer driver 34 feeds the CMY values via printer interface 46 to printer 30 where they are stored in bitmap memory 37 within printer 30. The CMY values may be altered by printer 30 so as to provide a black (hereinafter "K" value) in accordance with standard under color removal ("UCR") or gray component replacement ("GCR") techniques. Alternatively, it is possible for printer driver 34 to provide an appropriate K value.

In any event, bitmap memory 37 may store a full bitmap image of the printed image, or it may store only a band or partial bitmap image. When sufficient color data, namely CMYK data, is stored in bitmap memory 37, a color print head 36 reciprocates across a platen adjacent a sheet of paper. In the presently preferred embodiment, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 5:
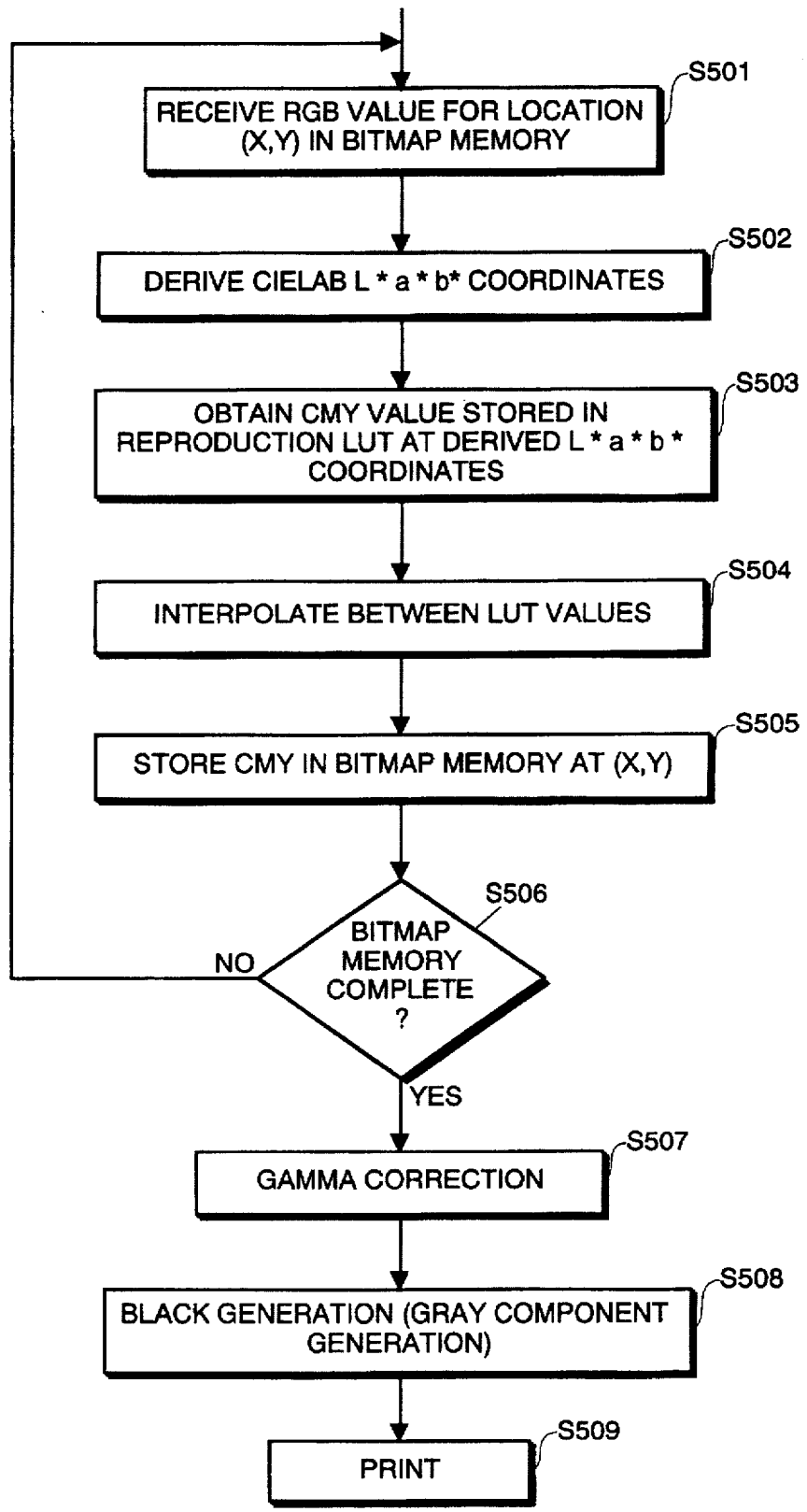
FIG. 5 is a flow diagram showing printing by a printer driver according to the invention.

FIG. 5 is a flow diagram showing how printer driver 35 selects CMY values from the color data provided by CPU 40. In step S501, printer driver 34 receives RGB values for a location (x,y) in bitmap memory 37. In step S502, printer driver 34 derives device independent color coordinates from the RGB value. Preferably, the device independent coordinates are L*a*b* coordinates in CIELAB space. This is because the coordinates in CIELAB space can enclose the gamut of any printer or monitor, and also because both tri-linear and tetra-linear interpolation techniques work well in this space.

Flow then advances to step S503 which looks up corresponding CMY values stored in reproduction LUT 35 at the derived L*a*b* coordinates. In step S504, interpolation is performed so as to obtain an interpolated CMY value in a case where the derived L*a*b* coordinates are not identically found in reproduction LUT 35. Appropriate interpolation techniques include, as mentioned above, both trilinear interpolation and tetrahedral interpolation.

In step S505, the CMY values are stored in bitmap memory 37 at location (x,y). If desired, the CMY values may be modified before storage, for example, by appropriate UCR or GCR techniques so as to obtain a K value.

In step S506, printer driver 34 determines whether the bitmap memory has been completed, or if a needed part or band of bitmap memory 37 has been completed. If the bitmap memory has not been completed, then flow returns to step S501 in which the next RGB value is received for the next location (x,y) in bit map memory. On the other hand, if the bitmap memory has been completed, or if a sufficient area of the bitmap memory has been completed (such as an eight row long band corresponding to the eight rows of ink jet nozzles in head 36), then flow advances to step S507 where gamma correction is performed. Gamma correction corrects the CMY values in bitmap memory so as to achieve a uniform distribution of luminanos. Gamma correction may be carried out either by printer driver 34 or by printer 30, or by a combination thereof, as appropriate. In step S508, UCR or GCR is performed, if not already performed, so as to derive a black value for location (x,y) in bitmap memory. UCR in the present embodiment may be performed by the szmple expedient of selecting the minimum value of CMY and assigning that value to the black value. Then, each of the CMY values is adjusted by subtracting the assigned black value.

The order of steps S507 and S508 is not critical, and those steps may be switched, for example, to accommodate a particular color printing technique such as continuous tone, dither or error diffusion.

In step S509, color printing is initiated using the CMYK values stored in bitmap memory 37.

Figure 6:
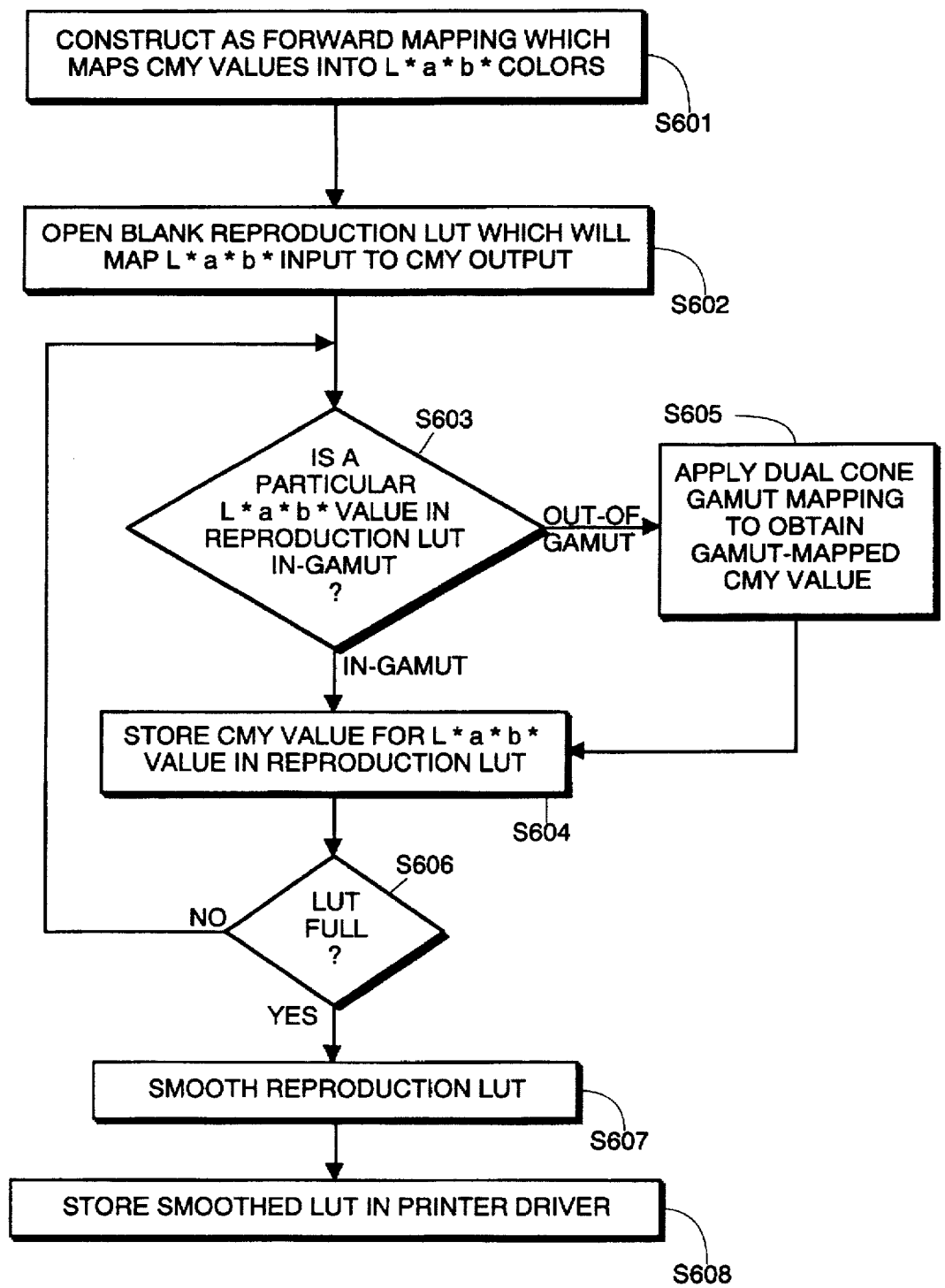
FIG. 6 is a flow diagram showing how to construct a reproduction LUT for use in a printer driver according to the invention.

FIG. 6 is a detailed flow diagram showing the steps, including the gamut-mapping steps, by which CMY values are stored in reproduction LUT 35. As will be described in further detail below, those steps generally include construction of a forward mapping of CMY input to L*a*b* output for each particular printer, such as by printing a large number of colors printable by each different printer 30 thereby to measure the gamut for each different printer 30, testing each individual L*a*b* value in reproduction LUT 35 to determine if it is in-gamut or out-of-gamut, for in-gamut colors storing a colorimetrically-matched CMY value in reproduction LUT 35, while for out-of-gamut colors applying a dual-cone gamut mapping technique so as to obtain a gamut-mapped CMY value, repeating the process for each individual L*a*b* value in reproduction LUT 35 until the reproduction LUT is full, smoothing the reproduction LUT, and storing the reproduction LUT in printer driver 34.

The process steps of FIG. 6 result in a reproduction LUT, which is included in printer driver 34, in which for close-in out-of-gamut colors a perceptually matched CMY value is stored and in which for far-out-of-gamut colors a saturation matched CMY value is stored.

The process steps shown in FIG. 6 need only be performed once, for each different kind of printer 30, to derive a reproduction LUT 35 specifically tuned to each different kind of printer, ordinarily, these steps are performed once by a printer manufacturer, to be used in a printer driver which is sold to end users on a floppy disk as part of a printer. It is also possible for a printer manufacturer to upload the printer driver to, for example, a computer bulletin board, from which end users can download the printer driver to their disk 25.

With specific reference to FIG. 6, step S601 constructs a forward mapping of CMY input values to L*a*b* output values, so as to measure the gamut of printer 30. Preferably, this is achieved by printing a very large subset of all colors printable by printer 30. For example, in the printer used in the presently preferred embodiment shown in FIG. 2, a subset of about nine different values for each of CMY values gives $9^3=729$ different CMY color combinations. Based on these 729 color combinations, a forward mapping from CMY input to L*a*b* output is constructed and stored in a table, as described more fully in connection with FIG. 7.

Step S602 opens a blank reproduction LUT 35 in which will be stored CMY values to be printed based on L*a*b* input values corresponding to both in-gamut and out-of-gamut colors. Once filled with CMY values, the blank reproduction LUT will be included in printer driver 34 so as to map L*a*b* input to CMY output, as described above in connection with FIG. 5.

Steps S603 through S606 store CMY values in each L*a*b* location in reproduction LUT 35, and those steps are repeated until the reproduction LUT is full. Thus, in step S603, a particular L*a*b* location in reproduction LUT is tested to determine if it is an in-gamut color, based on the gamut measured in step S601. One preferred method for determining whether a particular L*a*b* value is an in-gamut color is to attempt an inversion, using numerical techniques such as the well-known Newton's inversion method, to determine whether it is possible to obtain a CMY value based on the forward mapping obtained in step S601. If the inversion attempt fails to converge to a numerically printable CMY value, then step S603 determines that the particular L*a*b* value is out-of-gamut. On the other hand, if the inversion attempt converges to a numerically printable CMY solution, then step S603 determines that the particular L*a*b* value is an in-gamut color.

If the L*a*b* value is an in-gamut color, then flow advances to step S604 in which the printable CMY value for the L*a*b* value, which is a colorimetrically matched value, is stored in reproduction LUT 35.

If step S603 determines that a particular L*a*b* value is an out-of-gamut color, then flow branches to step S605 so as to gamut-map the L*a*b* target color into a printable CMY value. As detailed more fully below in connection with FIG. 9, gamut mapping is performed by applying a dual-cone gamut mapping technique in which the target L*a*b* color is first projected onto an actual cone and then projected onto an ideal cone, the projection onto the actual cone is de-saturated until an in-gamut CMY value is found, and a weighted average is taken of this in-gamut CMY value with the CMY of the projection onto the ideal cone, the weighting being based on the distance between the projection onto the actual cone and the target L*a*b* color. The gamut-mapped printable CMY value is then stored, as shown in step S604, for the L*a*b* value in reproduction LUT 35.

Step S606 determines whether reproduction LUT 35 is full. If the reproduction LUT is not yet full, then flow returns to step S603 until CMY values have been stored in each L*a*b* location in the reproduction LUT.

When the reproduction LUT is full, flow advances to step S607 in which the reproduction LUT is smoothed. Smoothing is described more fully below in connection with FIG. 15 in which a local relaxation and a shift is applied to the reproduction LUT.

Flow then advances to step S608 in which the smoothed reproduction LUT is stored in printer driver 34. As mentioned above, the printer driver, with reproduction LUT 35, is then stored on computer readable medium, such as by being stored onto a floppy disk or being uploaded to a computer bulletin board, for distribution to end users in connection with a printer.

Figure 7:
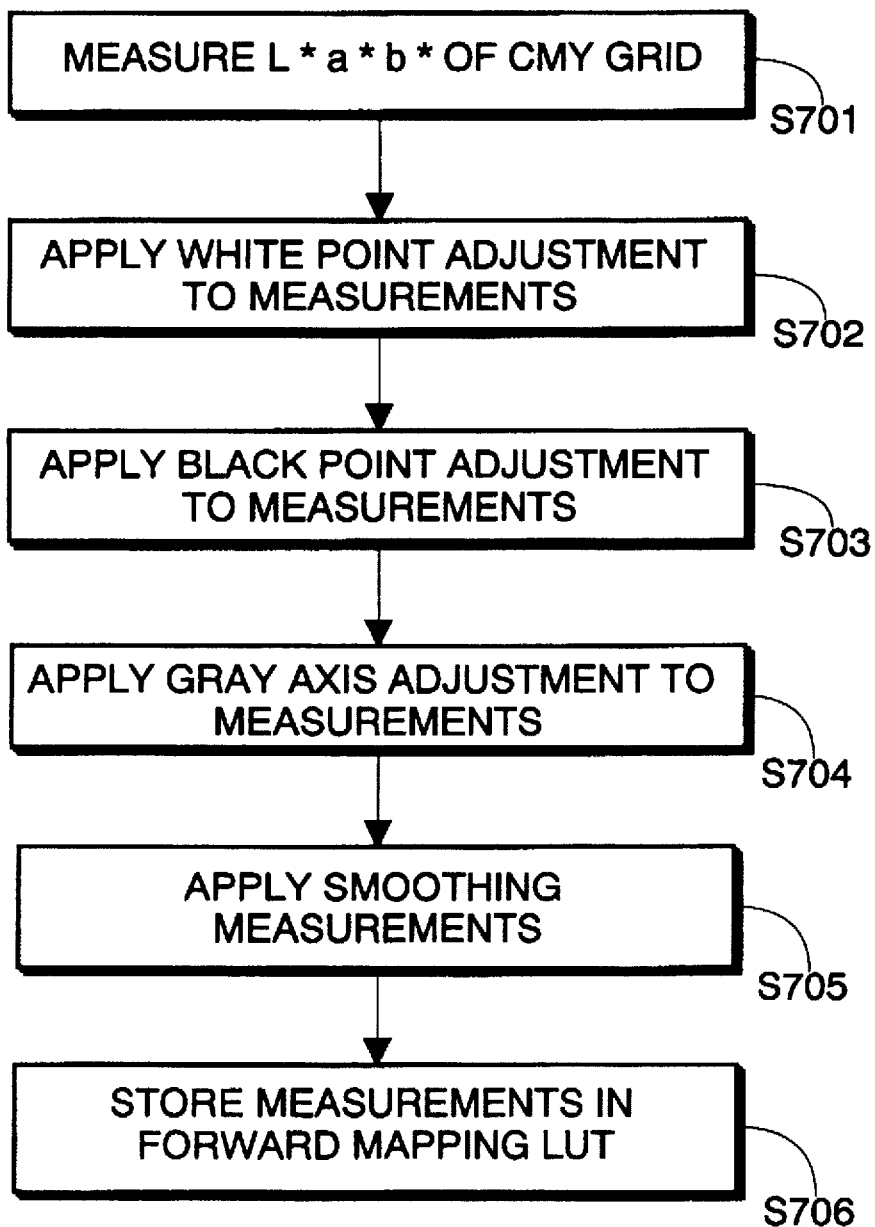
FIG. 7 is a flow diagram for explaining how to construct a forward mapping for a typical printer.

FIG. 7 is a flow diagram showing how to construct a forward mapping of CMY input to L*a*b* output by printing out various combinations of CMY values so as to measure the printable gamut of colors. As detailed more fully hereinbelow, the steps shown in FIG. 7 involve measuring, in L*a*b* coordinates, an evenly spaced grid of CMY colors, applying a white point adjustment to the measured L*a*b* values, applying a black point adjustment to the measured values, applying a gray axis adjustment to the measured values, and then smoothing the adjusted measurements.

Specifically, in step S701, a regular grid of CMY values is printed and then measured, using, for example, a Gretag SMP100 spectrophotometer with 2° observer and D65 luminance. From a standpoint of accuracy and completeness, it is of course always preferable to measure as many CMY color combinations as possible, but for an eight-bit per component printer, $(2^8)^3=16,777,216$ possible such combinations exist. Accordingly, it is presently preferred to measure nine regularly spaced CMY values, resulting in $9^3=729$ color combinations of CMY values. Together these points form a grided box in CMY space, each point being addressed by the printed CMY value and the content of each point being the measured L*a*b* value.

While it is possible to use the measured L*a*b* values as the forward mapping in step S601, it is preferable to apply a number of adjustments (such as white point, black point, gray axis, and smoothing adjustments) to the measured L*a*b* values before using them. Thus, in step S702, a white point adjustment is made to the measurements so that the white paper on which the CMY color combinations were printed ends up with an L*a*b* value of (100,0,0). Preferably, a Von Kries white point adjustment is made to the measured value by first transforming the measurements to XYZ coordinate space using the illuminant, here, D65, as reference white and then transforming back to L*a*b* values using the measured value of paper as reference white.

In step S703, a black point adjustment is applied to the measured value so as to ensure that they cover the entire L* range, that is, from 0 to 100. The black point adjustment is made by designating the L*a*b* measured value for CMY= (100%,100%,100%) ink after white point adjustment. Then, for each other measured L*a*b* value, the following adjustment is made, where $(1_{min}, a_{min}, b_{min})$ is the L*a*b* values for the black point:

$$\begin{bmatrix} l' \\ a' \\ b' \end{bmatrix} = \begin{bmatrix} l \\ a \\ b \end{bmatrix} - \left( \frac{100-l}{100-l_{min}} \right) \begin{bmatrix} l_{min} \\ a_{min} \\ b_{min} \end{bmatrix}$$

Thereafter, in step S704, a gray axis adjustment is made to the measurements. Specifically, most color printers use black as well as cyan, magenta and yellow, but it is not always necessary for printer driver 34 to produce a black color component. This is because the black color component is often generated by UCR or GCR performed by printer 30 itself. Most such printers typically use some variation of a 100% GCR replacement technique wherein equal amounts of CMY are replaced by K. Thus, so long as reproduction LUT 35 stores equal amounts of CMY in locations corresponding to a gray color, such a reproduction LUT would produce pleasing grays. However, since the reproduction LUT described so far depends on actual measured values, without gray axis adjustment it is not possible to guarantee that equal amounts of CMY are stored at locations corresponding to gray colors. Specifically, without gray scale adjustment, it is possible for a gray scale image to be produced in which some tones would appear neutral, some would have a slight reddish cast, some would have a slight greenish cast, etc., all of which would be disturbing to a viewer who expected a pure gray scale image.

Gray axis adjustment according to step S704 proceeds as follows. For each measured L*a*b* value, its corresponding CMY value is inspected, and if C=M=Y, then a* and b* are set to zero. Otherwise, a* and b* are left unchanged.

Step S705 applies smoothing so as to eliminate non-smooth characteristics of the forward mapping. Such non-smooth characteristics may be introduced from a variety of sources, such as measurement error, errors introduced by the halftone or dithering or GCR processes used by printer 30, and the above gray axis adjustments. Thus, step S705 smooths values with a smoothing technique which is described below and illustrated in FIG. 8.

Specifically, the smoothing technique is parameterized by two Values, an integer k and a real number z in which k is an integral divisor of n−1, wherein n is the size of the look-up table L after gray axis adjustment in step S704. In the presently preferred embodiment, n=9, meaning that there are nine values for each of C, M, and Y, all arranged in a three-dimensional grid as described above.

Figure 8:
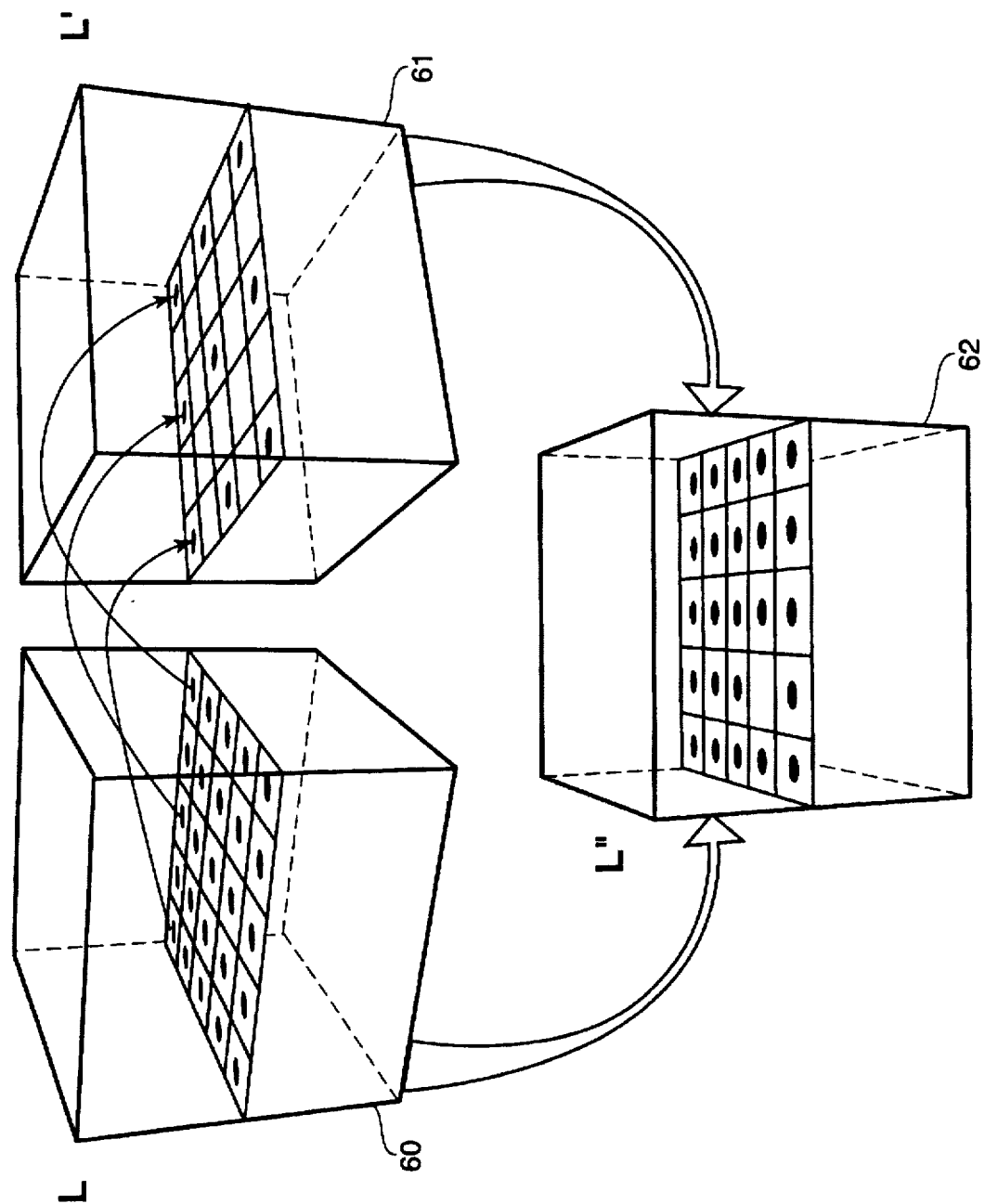
FIG. 8 is a view for explaining how to smooth a forward mapping.

FIG. 8 shows a simplified situation in which, for look-up table L, designated at 60, n=5 although only one layer, such as Y=30%, is shown. Next, a new look-up table of L', designated at FIG. 8 at 61, is formed with size $m^3$ by sub-sampling L, wherein $$m = \frac{n-1}{k} + 1$$

A weighted average of L and L' is obtained so as to form smoothed look-up table L", designated at 62 in FIG. 8. Look-up table L" is of size $n^3$. Weighting between L and L" is performed as follows. Let (c,m,y) be an entry in L, let $(l,a,b)_L$ be its corresponding measurement, let $(l,a,b)_{L'}$ be the result of interpolating (c,m,y) in L'. Then, the L" entry for (c,m,y) is given by:

$$\begin{bmatrix} l \\ a \\ b \end{bmatrix}_{L''} = z \begin{bmatrix} l \\ a \\ b \end{bmatrix}_{L'} + (1-z) \begin{bmatrix} l \\ a \\ b \end{bmatrix}_L$$

With the foregoing arrangement, with increasingly large k, the smoothness of L' increases but its accuracy decreases. With increasingly large z, more weight is given to the sub-sampled L' look up table in computing the smoothed L" look-up table. L" will be identical to L if z=0 or k=1.

Referring again to FIG. 7, in step S706, the smoothed look-up table L" is stored for the forward mapping look-up table used in connection with step S601.

Figure 9:
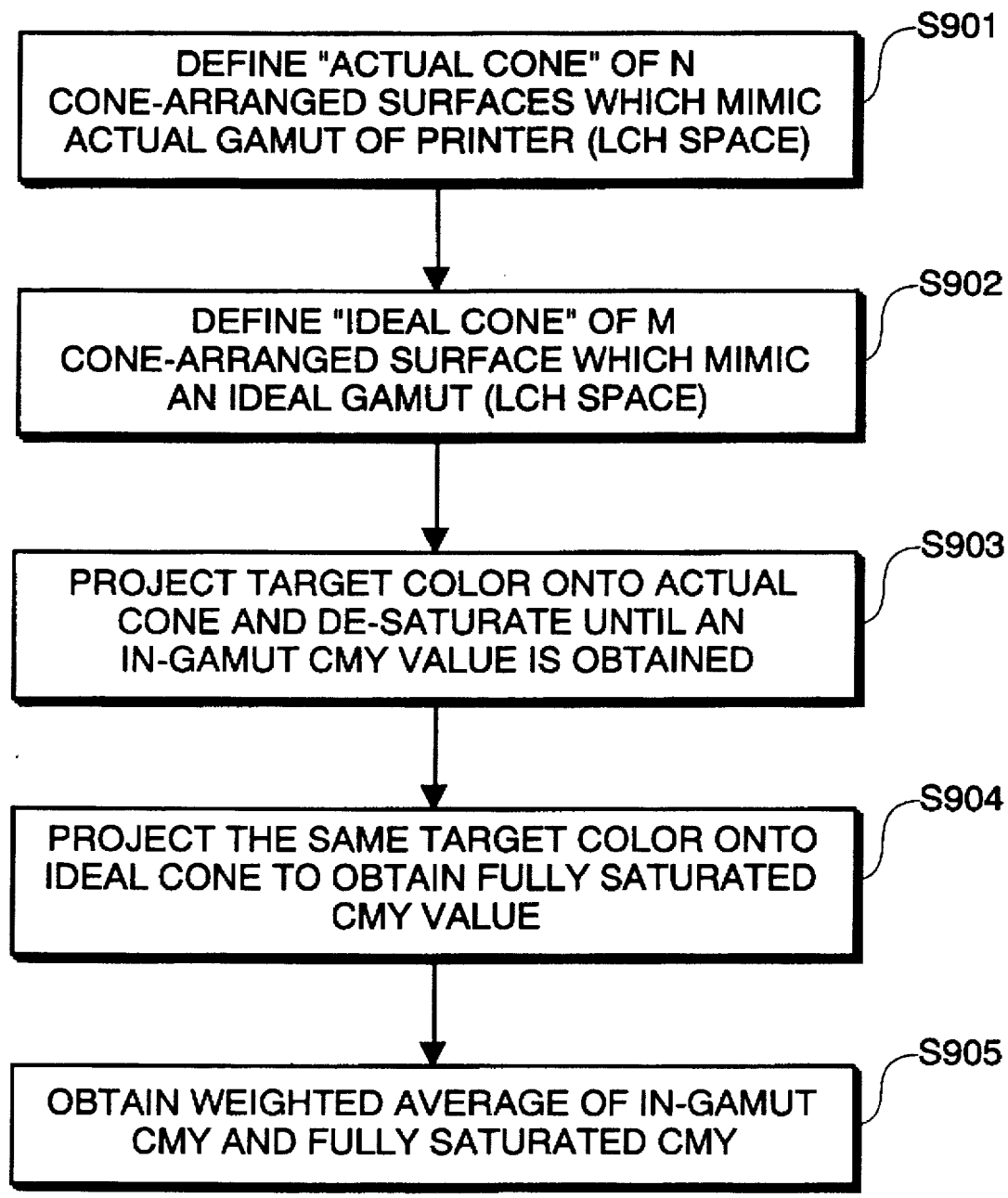
FIG. 9 is a view for explaining dual-cone gamut mapping.

FIG. 9 is a flow diagram for explaining dual cone gamut mapping by which step S605 obtains gamut-mapped CMY values for out-of-gamut L*a*b* colors. As explained more fully hereinbelow, gamut mapping shown in FIG. 9 proceeds by defining an "actual cone" of n-cone arranged surfaces which mimic the actual gamut of printer 30, defining an "ideal cone" of m-cone arranged surfaces which mimic an ideal gamut such as the gamut of monitor 23, projecting a target color in L*a*b* coordinates onto the actual cone and de-saturating the projected target color until an in-gamut CMY value is obtained, projecting the same target color onto the ideal cone and obtaining fully-saturated CMY values, and obtaining a weighted average of the in-gamut CMY and the fully-saturated CMY, weighting proceeding in accordance with the distance between the projection onto the actual cone and the target color.

Figure 10:
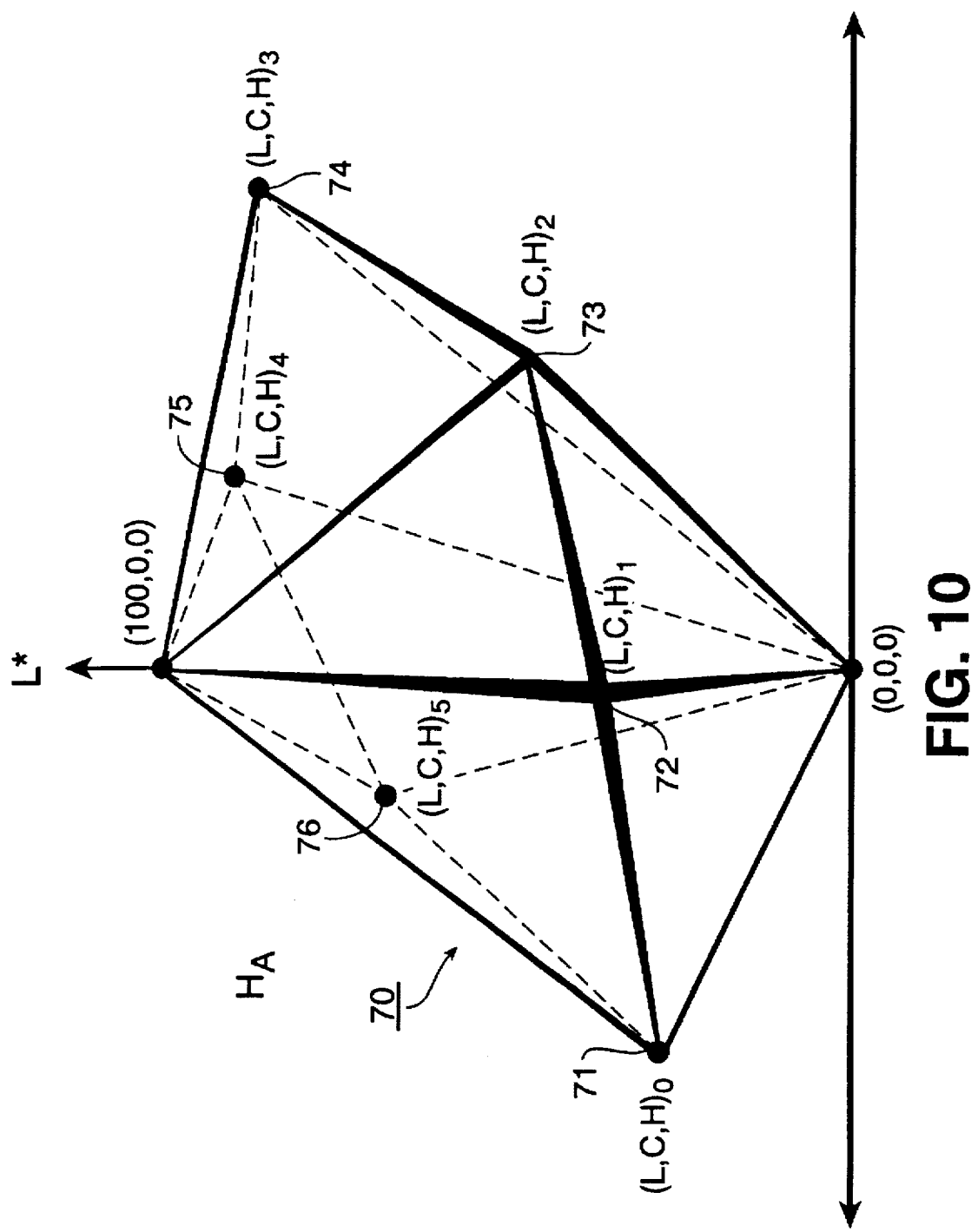
FIGS. 10 through 14 are views showing how to project a target out-of-gamut color onto actual cones and ideal cone in accordance with the dual-cone gamut mapping of the invention.

Specifically, referring to FIG. 9, step S901 specifies defining an "actual cone" of N-cone arranged surfaces which mimic the actual gamut of printer 30. A suitable actual cone is shown in FIG. 10. As seen there, actual cone $H_A$, which is designated by reference numeral 70, is defined by N chromatic vertices such as vertices 71, 72 . . . 76, in a case where N=6. The N upper surfaces of the N-cone are triangles formed by white point (100,0,0) and each of the chromatic vertices, while the N lower surfaces are triangles formed by black point (0,0,0) and each of the chromatic vertices.

The LCH values of each of chromatic vertices 71 through 76 are chosen by selecting N combinations of CMY and using the forward model obtained in step S601 to compute their LCH values. (The ensuing discussion freely mixes LCH values with L*a*b* values. As will be readily apparent to those skilled in the art, LCH values and L*a*b* values refer to the same physical CIELAB color space; it is simply that LCH values are cylindrical coordinate values whereas L*a*b* values are rectangular coordinate values.) For N=6, typical CMY combinations used are:

$(C,M,Y)_0 = (100\%, 0\%, 0\%)$
$(C,M,Y)_1 = (100\%, 100\%, 0\%)$
$(C,M,Y)_2 = (0\%, 100\%, 0\%)$
$(C,M,Y)_3 = (0\%, 100\%, 100\%)$
$(C,M,Y)_4 = (0\%, 0\%, 100\%)$ (C,M,Y)$_S$=(100%,0%,100%)

While the values specified above ensure that each of the chromatic vertices lies exactly on the gamut of printer 30, and that the resulting N-cone therefore closely mimics the actual gamut of printer 30, it is not necessary to use the values specified above. Specifically, in some instances, it is possible to specify other values for CMY, values which do not lie identically on the surface of the printer gamut, such as in situations where it is desired to even-out spacing of chromatic variations. In such cases, as specified in the appendix, CMY values of (80%,80%,0) and the like may be more appropriate. Appropriate values of CMY for use as chromatic vertices may readily be obtained by those skilled in the art based on the instant specification and the appendix hereto.

Figure 11:
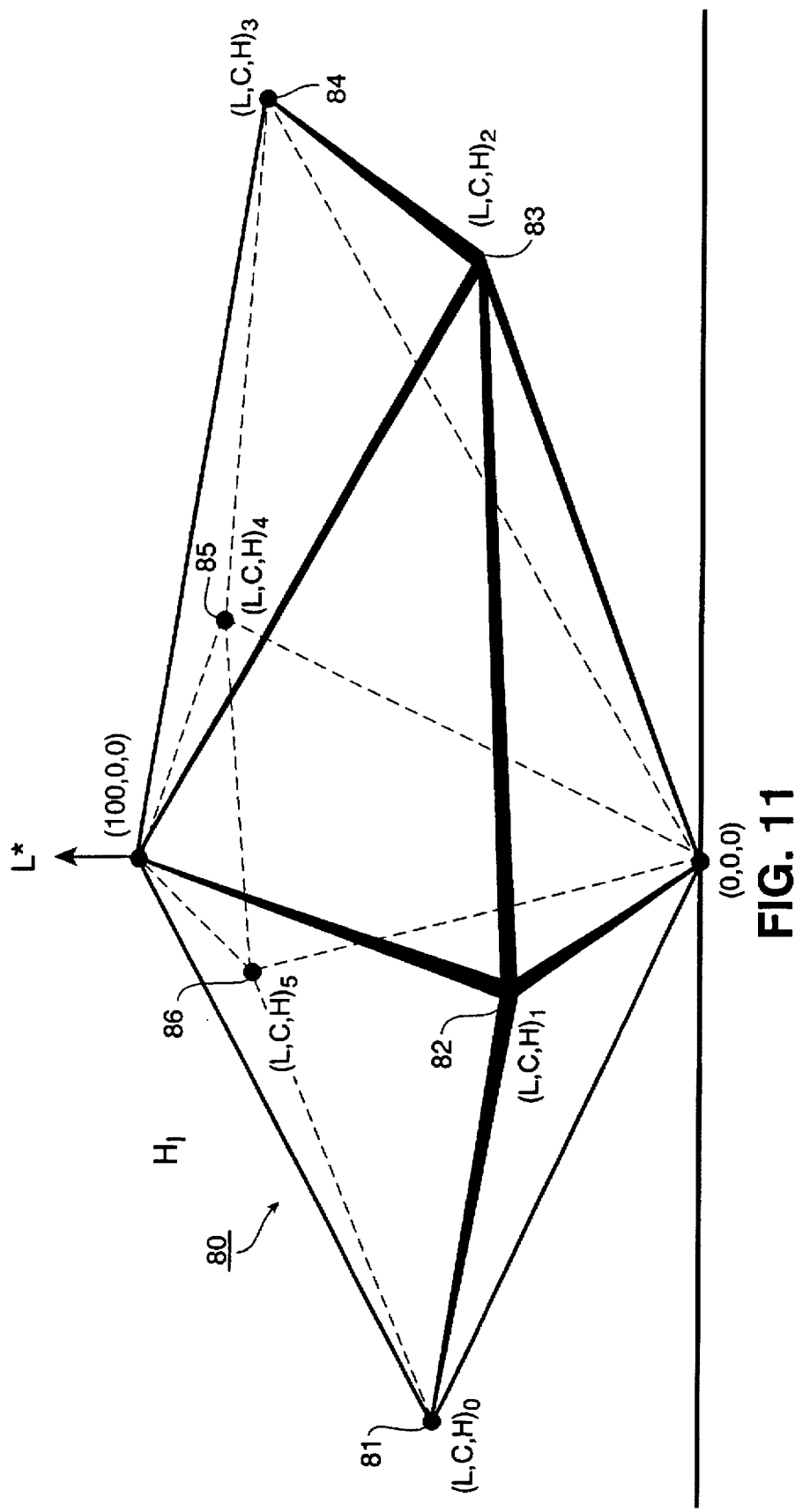

Reverting to FIG. 9, step S902 involves defining an "ideal cone" of M-cone arranged surfaces which mimic an ideal gamut such as the gamut of a typical RGB monitor. A suitable ideal cone is shown in FIG. 11. As seen there, ideal cone $H_I$, designated generally with reference numeral 80, includes M chromatic vertices such as vertices 81 ... 86, for M=6. The M upper surfaces of the M cone are triangles formed by white point (100,0,0) and each of the chromatic vertices. The lower M surfaces are triangles formed by black point (0,0,0) and each of the chromatic vertices.

Suitable values for the chromatic vertices for ideal M-cone 80 are obtained by setting M=6 and computing the vertices from a monitor's RGB primaries and secondaries. In this case, a standard CIE-defined RGB→CIEXYZ→LCH transformation for a typical RGB monitor is used. At each vertex of $H_I$, a CMY combination is chosen that is subjectively deemed to be the best saturation match for the RGB color. For example, it might be decided that RGB fully-saturated blue is best reproduced by CMY=(100%,50%,0), or that RGB fully-saturated green is best reproduced by CMY=(60%,0,100%), and so forth. Other suitable values for CMY at each of the chromatic vertices of the ideal hex cone 80 are described in the appendix to this application. In this regard, it is noted that in some instances, M and N are best not equal to each other and that it may be desirable for M to be greater than N, such as M=8. In those instances, the additional chromatic vertices for ideal hex cone 80 enable the resulting gamut-mapped colors to reproduce highly saturated in-gamut colors like CMY=(100%,100%,0) or CMY=(100%,0,100%). Appropriate values of CMY for use as chromatic vertices may readily be obtained by those skilled in the art based on the instant specification and the appendix hereto.

For both actual cone 70 and ideal cone 80, and for each chromatic vertex in those two cones, two additional parameters are defined: an attenuation factor "a" and a slope factor δ. The attenuation factor "a" is used in connection with weighting between an in-gamut CMY value and a fully-saturated CMY value, and the slope factor δ is used in connection with projecting a target color onto the surface of each of the actual cone 70 and the ideal cone 80. Both of these processes are described more fully below.

Figure 12A:
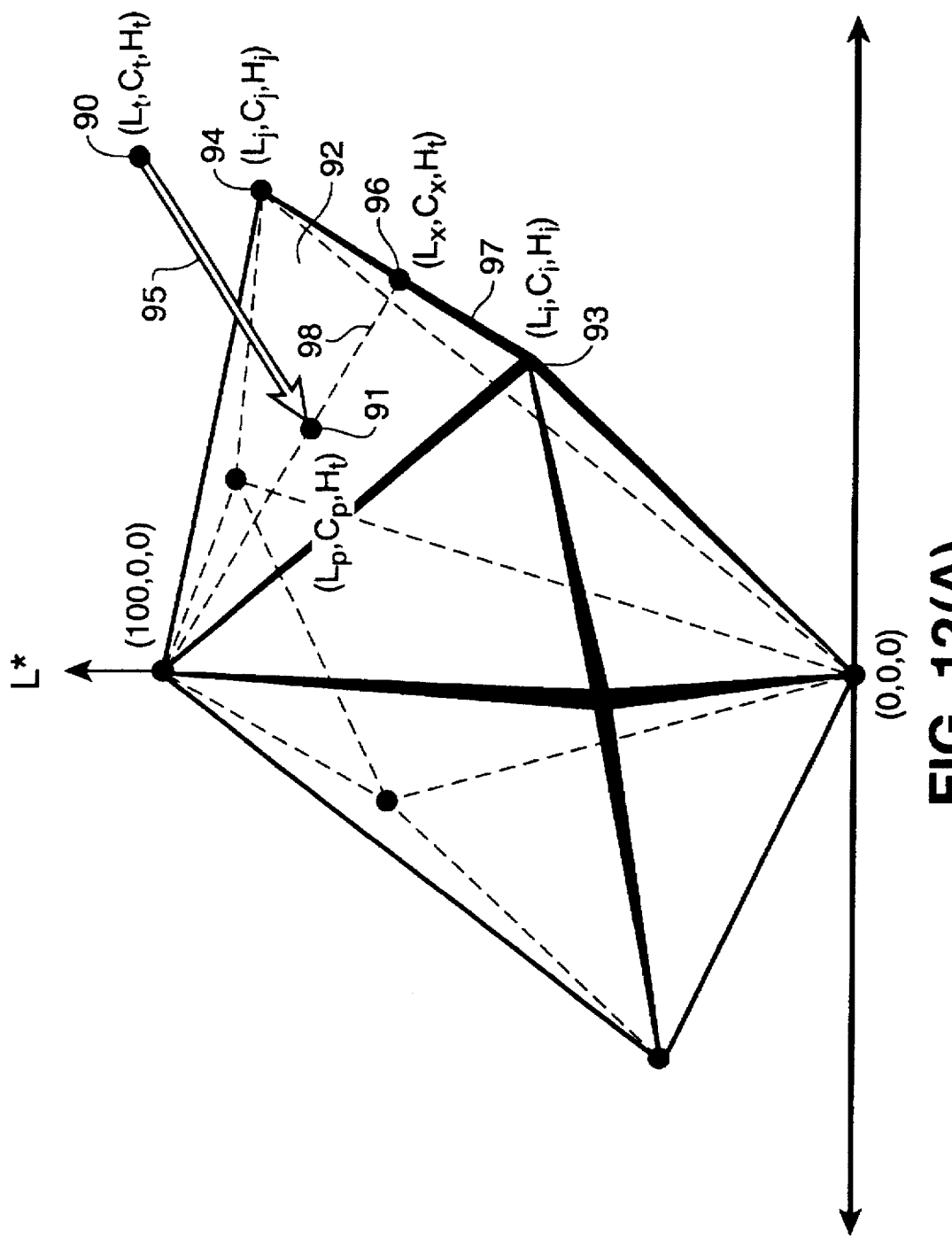
Figure 12B:
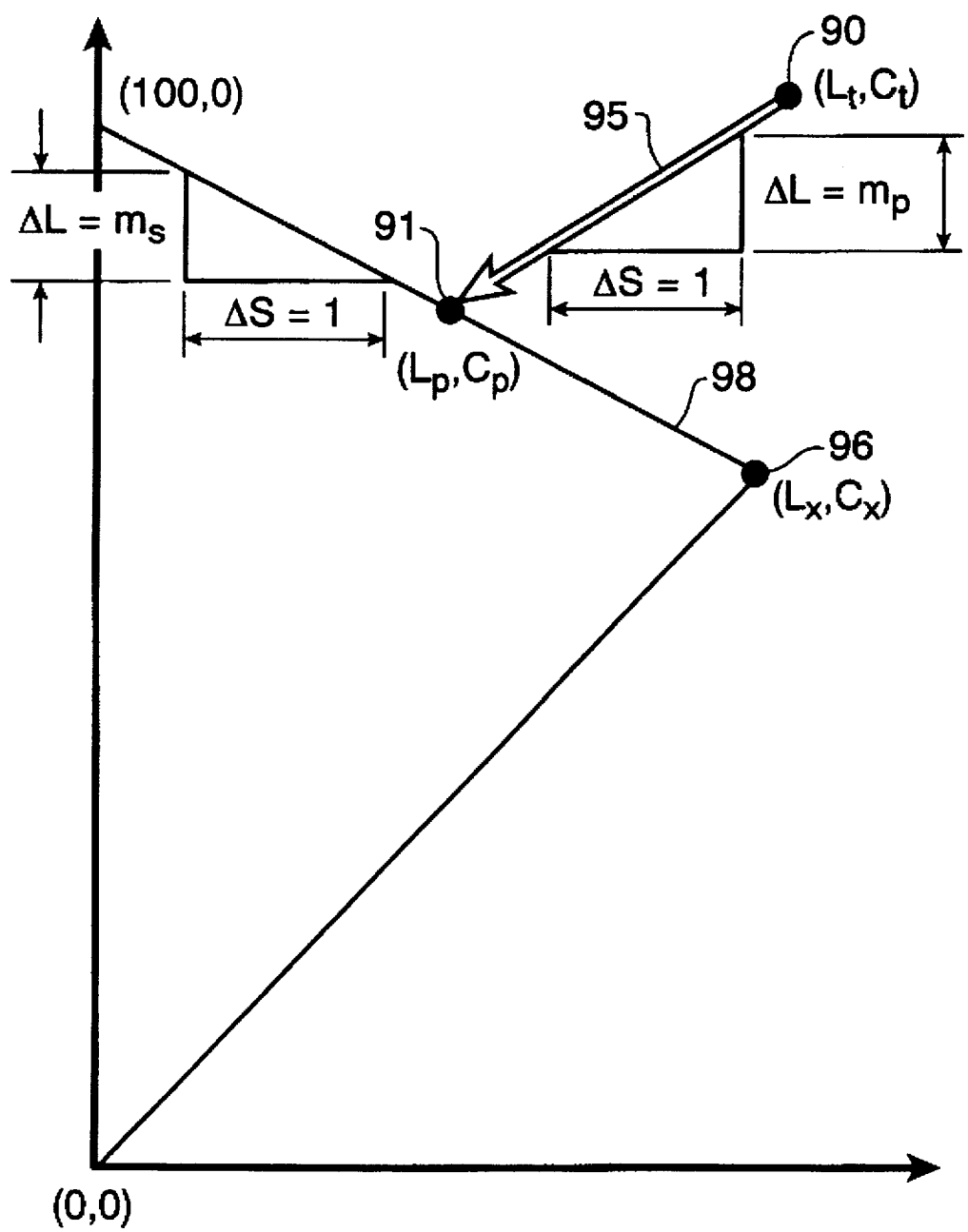
Figure 12C:
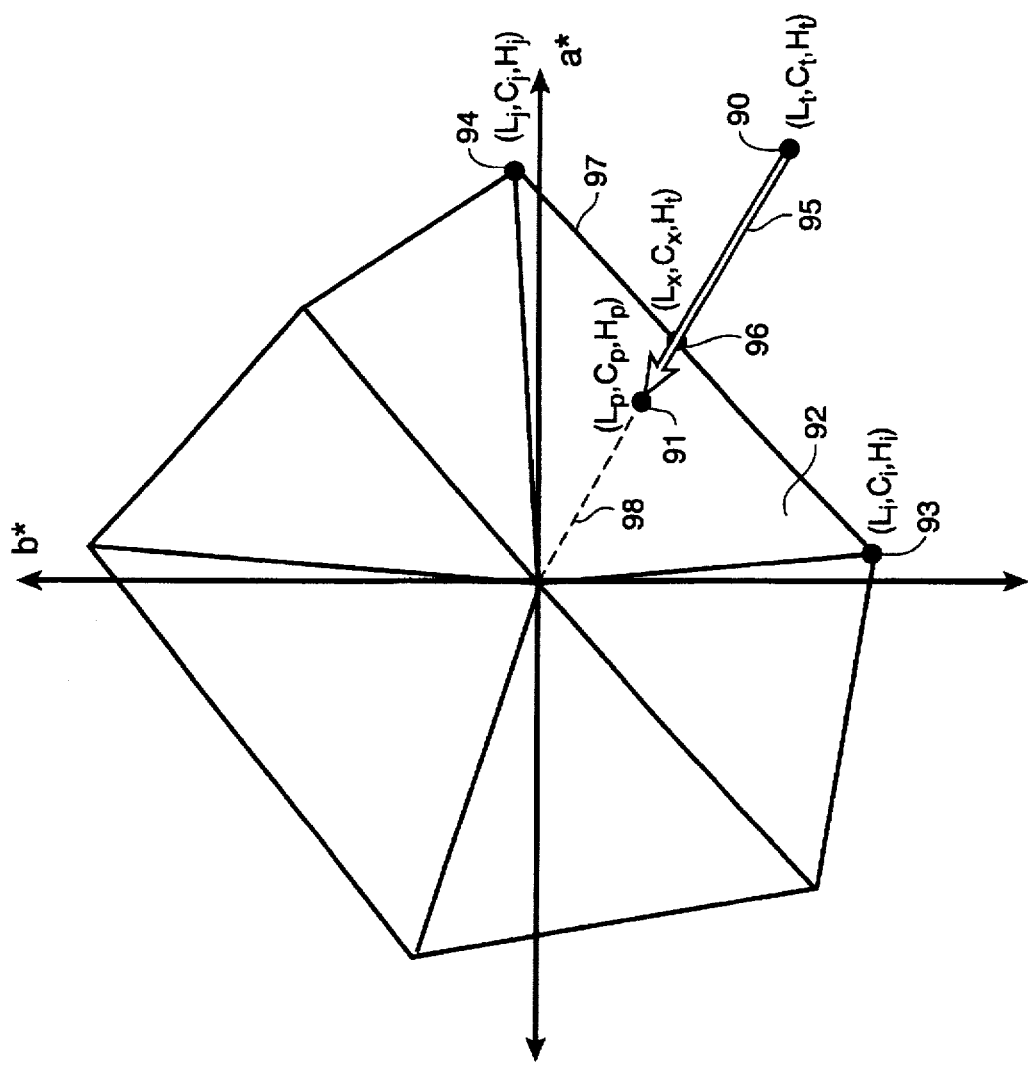

Specifically, FIGS. 12(A), 12(B) and 12(C) are perspective, side and top views, respectively, showing projection of an out-of-gamut target color onto a surface of an N or an M cone. Specifically, as seen in these figures, an out-of-gamut target color 90 is projected to a point 91 on one surface 92 of the M or N cone-arranged surfaces. The surface onto which out-of-gamut target color 90 is projected is selected to be the surface with chromatic vertices which are clockwise-closest in hue to the hue of target color 90 and counterclockwise-closest in hue to the hue of target color 90. In FIGS. 12a through 12c, the clockwise-closest chromatic vertex is designated as 93 and the counterclockwise-closest vertex is designated as 94. The slope $m_P$ of projection line 95 from target color 90 to projection point 91 depends on the slope factor δ and on the difference between the luminance of target color 90 and the luminance of a point 96 (called the "crux") which lies at the same hue as that of the target color on a line 97 that lies between chromatic vertices 93 and 94. Thus, the slope $m_P$ is set as follows:

$$m_P = \frac{(1-w)\delta + w - 1}{m_s}$$

where $$w = \begin{cases} \frac{100 - L_t}{100 - L_\alpha} & L_t \geq L_\alpha \\ \frac{L_t}{L_\alpha} & L_t < L_\alpha \end{cases}$$

and where $m_S$ is the slope of the line 98 between the white or black origin and the crux (point 96), and where δ is the slope factor.

Figure 13:
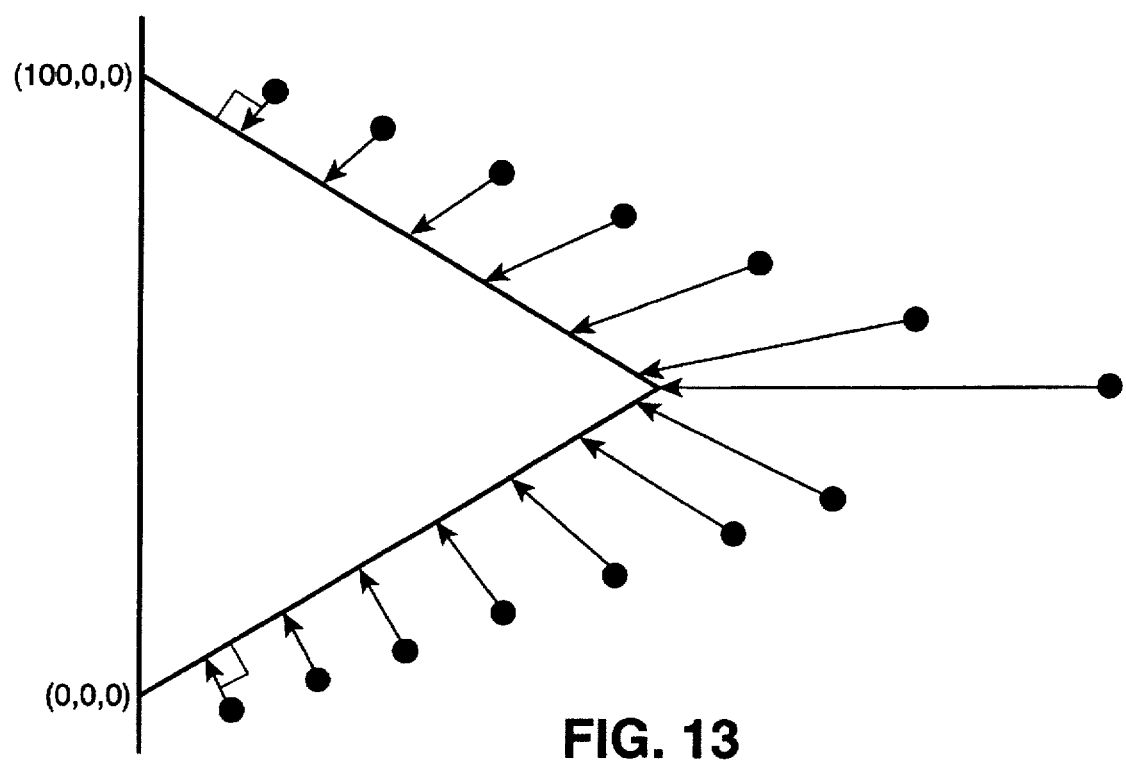

In practice, selecting a value for the slope factor δ depends on both the hue region in question and on the gamut of the particular printer 30 in question. The appendix to this specification gives suitable values for a wide variety of situations. Here, it will be noted that a value of δ=1 gives a slope for the projection line of $m_P$=0 so that the projection line has a slope of zero regardless of the luminance of target color 90. On the other hand, a value of δ=0 gives a slope $m_P$ of the projection line which has a value of zero when the target luminance is equal to the crux luminance, and which has a value which makes the projection line 95 orthogonal to the surface as the target luminance approaches either zero or 100. This latter situation is depicted in FIG. 13 for plural out-of-gamut target colors (each of which are indicated by a "dot") at various luminance values.

It should be noted that the slope factor δ used in the above equation is an interpolated slope factor which depends upon the position of crux point 96 between chromatic vertex 93 and 94, and on the stored values of the slope factors for each chromatic vertex 93 and 94.

Having now completed a description of how to project an out-of-gamut target color 90 onto the surface of the actual cone or the ideal cone, attention is redirected to step S903 of FIG. 9 so as to complete description of how to apply dual cone gamut mapping so as to obtain a gamut-mapped printable CMY value for an out-of-gamut color. As specified at step S903, the out-of-gamut target color is projected onto actual cone 70 so as to obtain a projected point on a surface of actual cone 70. This is shown in side view in FIG. 14 in which out-of-gamut target color 101 is projected to a point $P_A$ on the surface of actual cone $H_A$. Thereafter, as further shown in FIG. 14, and as specified at step S903, the projected point $P_A$ is de-saturated until an in-gamut CMY value, such as that shown at point r is obtained.

Figure 14:
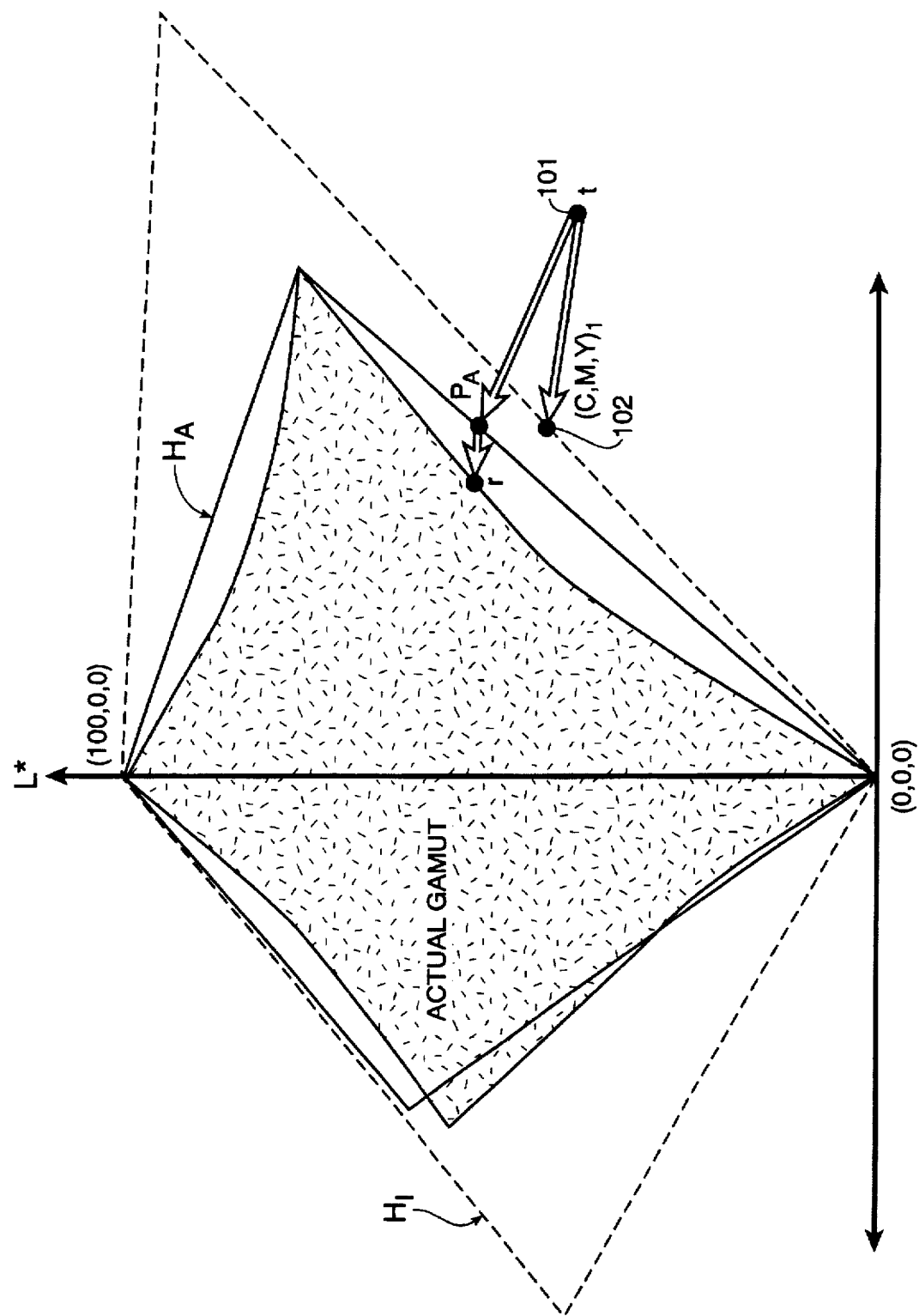

Then, in step S904, the same target color 101 is projected onto ideal cone $H_I$ to obtain a fully saturated CMY value, which is shown in FIG. 14 at 102. Finally, in step S905, a weighted average is obtained between the in-gamut CMY color specified at point r and the fully-saturated CMY color specified at point 102. The weight of the weighted average is determined so that for largely-saturated out-of-gamut target colors 101, fully saturated color 102 dominates, whereas for less-saturated out-of-gamut colors 101, (i.e., those colors for which target color 101 is close to $H_A$), the in-gamut CMY value at point r dominates. In the present situation, the weight w of the weighted average is given by $$w = \begin{cases} \dfrac{1 - \cos\left(\dfrac{\max\{0, a_I - \Delta E(t, p_A)\}}{a_I}\right)\pi}{2} & C_t > C_{P_A} \\ 1 & C_t \le C_{P_A} \end{cases}$$

where $a_I$ is the attenuation factor of point 96 (see FIG. 12) as interpolated between each of chromatic vertices 93 and 94, and $\Delta E$ is the Euclidean distance in L*a*b* space between the target out-of-gamut color 101 and point $P_A$ on the surface of actual cone $H_A$.

The so-calculated weight w is used to calculate the weighted average as follows:

$$\begin{bmatrix} C \\ M \\ Y \end{bmatrix}_t = wr + (1-w)\begin{bmatrix} C \\ M \\ Y \end{bmatrix}_t$$

In calculating the above weight, w, it is preferred to use Euclidean distance in L*a*b* space as the measure of the distance between the target color and its projection onto actual cone $H_A$. However, other measures of this distance may also be employed. For example, a so-called "city block" distance function can be employed, and it is possible also to employ measures of distance which emphasize one component (such as saturation) at the expense or even total exclusion of another component (such as luminance). In this latter regard, since in the preferred embodiment the target color is projected onto the actual cone $H_A$ at the same hue angle as the target color, the difference in hue between the target color and its projection onto $H_A$ is exactly zero; thus, in the preferred embodiment, the Euclidean distance between the target color and its projection onto $H_A$ depends only on differences in saturation and luminance.

Finally, so as to account for the possibility that the weighted CMY value has a component greater than 100%, the following equation is employed so as to limit each of the CMY values to 100%.

$$\begin{bmatrix} C \\ M \\ Y \end{bmatrix}_t = \max\left\{\begin{bmatrix} 0 \\ 0 \\ 0 \end{bmatrix}, \begin{bmatrix} C \\ M \\ Y \end{bmatrix}_t - \max\{0, \max\{C_t, M_t, Y_t\} - 100\%\}\right\}$$

By virtue of the arrangement described above, for out-of-gamut target colors far from the printer gamut (and consequently far from actual cone $H_A$) the resulting CMY color is determined primarily by CMY values for ideal cone $H_I$. As out-of-gamut target colors approach the actual cone $H_A$, the direction of projection becomes more and more influenced by the actual cone. Thus, gamut mapping according to the technique described in FIG. 9 has the dual advantages that target colors close into the actual gamut of printer 30 are reproduced with a perceptual match, whereas target colors with large saturation are reproduced with a saturation match.

Figure 15:
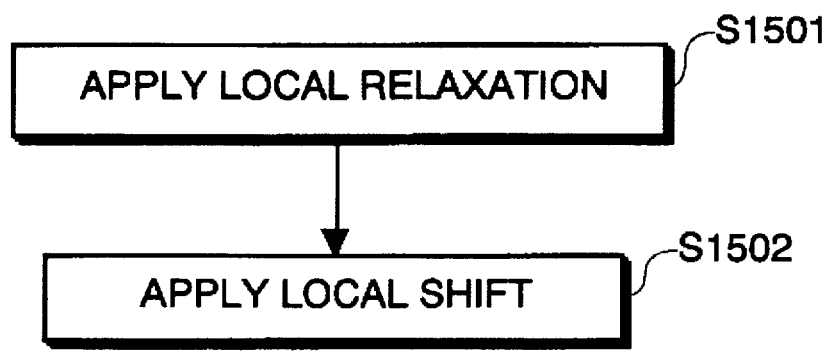
FIG. 15 is a flow diagram for explaining how to smooth a reproduction LUT.

FIG. 15 is a flow diagram showing in more detail the smoothing process mentioned at step S607 in FIG. 6. Specifically, as shown in FIG. 15, to smooth reproduction LUT 35, a local relaxation is applied in step S1501, and a local shift is applied in step S1502. The local relaxation and shift are parameterized by the following values:

n=the neighborhood to use for relaxation $(L,a,b)_c$=the center of the local relaxation area r=a radius of the local relaxation area w=the weight of the smoothing.

While the invention has been described with respect to an embodiment of a printer driver, it is to be understood that the invention can be embodied in any suitable color correction or printing system. For example, it is possible to embody the invention in a color management system, which is used in conjunction with a conventional printer driver, and which pre-processes color images in accordance with the invention and then feeds the processed color images to the conventional printer driver, thereby achieving the beneficial result of the invention. It is further possible to embody the invention in a color correction system which emulates color errors introduced by the printing process by processing an original color image in accordance with the invention and then displaying the processed color image on a color monitor, so as to emulate the effect of the color printing process. An operator can then compare the processed color image with what is desired, and based on the comparison can change the original color image so as to achieve some desired effect.

Thus, the invention has been described with respect to particular illustrative embodiments. It is to be understood that the invention is not limited to the above described embodiments and that various changes and modifications may be made by those of ordinary skill in the art without departing from the spirit and scope of the appended claims.

- 30 -

APPENDIX

1. System Overview

'Given a photograph, represented in calibrated RGB or L*a*b*, how can the photograph be best reproduced on a particular color printer?'.

To answer this question, a reproduction system consisting of the following components is proposed.

- A colorimetrically based description of the printer's behavior.
- A compensation for the white point and tonal range of the media.
- A tractable method for inverting the forward model, for colors that are in the printer's gamut.
- A tractable algorithm for mapping an L*a*b* value that is outside the printer's gamut to an in-gamut color.

The advantages and drawbacks of each of these components will be discussed below.

2. Modeling a Printer

The first building block of the system is a printer model, where "model" is used in the loosest sense. Rather than building a true physical model of ink mixing on paper, a large set of measurements is taken and interpolated between to approximate the printers true CMY→L*a*b* behavior. A numerical technique is then used to invert this system for a particular L*a*b* input.

2.1 The CMY→L*a*b* Look-up Table.

When a printer is sent a CMY[1] signal, the printer produces a color which can be measured[2]. For an 8-bit per component printer, all 16,777,216 possible combinations of CMY could be measured, but this would be impractical.

---

[1] It can also be thought of as an RGB signal where $C=\bar{R}, M=\bar{G}, Y=\bar{B}$.

[2] All measurements to date have been made using a Gretag SMP100 spectrophotometer with 2° observer and D65 illuminant.

- 31 -

A regular grid of CMY values is printed and measured, where each component is an ink percentage that is a multiple of 100/n and n is an integer greater than 1. For example, n=8 gives $9^3$ combinations of CMY in 12.5% increments. Imagine these points as forming an evenly spaced grid in CMY-space; this grid is used as a 3-D look-up table with *trilinear interpolation*. The address space of the LUT is CMY and the contents of the LUT are the measured L*a*b* values. A description of this straightforward interpolation method is omitted here, as it is well described elsewhere.

2.1.1 Accuracy

Let $(c,m,y)$ be some CMY value and let $(l,a,b)_n$ be the result of interpolating $(c,m,y)$ in a LUT of size $n^3$. The *interpolation error* of this CMY value in this LUT is given by, $$\Delta E((l,a,b)_n, (l,a,b)_{2^m})$$

Where $m$ is number of bits per component supported by the printer in question.

The distribution of interpolation error can be estimated by taking a random sample of CMY values, measuring their L*a*b*'s, computing their L*a*b*'s using the LUT, and calculating the $\Delta E$'s between these two sets of L*a*b*.

2.2 Measurement Adjustments

A number of adjustments can be made to the measured L*a*b* values before using them in the forward model. These include white point adjustment, black point adjustment, data smoothing, and gray axis adjustment. After these transformations have been applied to the measured data the modified measurements are used in an interpolation LUT.

An alternate approach would be to use the unmodified measurements in the LUT, and apply these transformations after interpolation. The former approach is preferred for ease of implementation, but these two approaches do not give identical results.

2.2.1 White Point Adjustment and Tonal Correction

The perceptual model is nothing more than a white point adjustment and a tonal correction. A Von Kries white point adjustment and a linear tonal correction in L*a*b* space is used, as described below.

- 32 -

In an open system, ...ges come from many sources ...nd one must be careful in ...ing assumptions about the ...tent of the input image. Examples of photographic RGB images include; PhotoCD images, desktop scans of transparencies, and professional CMYK scans that have been converted to RGB. Each of these RGB images has been subject to a different white point adjustment and tonal correction before it reaches the CMS. For optimal reproduction, the CMS should use a different white point adjustment and tonal correction for each of these types of images. Since such flexibility is not anticipated in the CMS, the simplifying assumption is made that an input RGB image has been corrected to look "good" on the user's monitor. A very simple white point adjustment and tonal correction is chosen and no claim is made that they are optimal.

2.2.1.1 White Point Adjustment

For the present purpose, think of the paper as being "white", regardless of its actual color. A Von Kries white point adjustment is then applied to the measured data such that the paper ends up with an L*a*b* value of $(100,0,0)$.[1]

This is done by first transforming the measurements to XYZ using the illuminant as the reference white, and then transforming them back to L*a*b* using the paper measurement as the reference white.

2.2.1.2 Black Point Adjustment

After the above white point adjustment has been made, the tonal range of the printer covers L* values from $l_{min}$ to 100. $l_{min}$ depends on the printer and will typically be greater than 5 and less than 30. Images, on the other hand, can have a tonal range from zero to 100 in L*. In order to map input tones to output tones with no clipping, the measured L*a*b* values are adjusted so that they cover the entire L* range.[2]

Let $(l_{min}, a_{min}, b_{min})$ be the measurement of 300% ink after white point adjustment, and call this the *black point*.

---

[1] Currently, the measurement instrument is a Gretag SPM-100, which computes L*a*b* values relative to the D65 measurement illuminant.

[2] Alternatively, the reproduction system could be designed to compress the input image tonal range to that of the printer.

- 33 -

For each measured value $(l,a,b)$ the following transformation is performed.

$$\begin{bmatrix} l' \\ a' \\ b' \end{bmatrix} = \begin{bmatrix} l \\ a \\ b \end{bmatrix} - \left( \frac{100-l}{100-l_{min}} \right) \begin{bmatrix} l_{min} \\ a_{min} \\ b_{min} \end{bmatrix}$$

This transformation has $(100,0,0)$ as a fixed point, and maps the black point to $(0,0,0)$. Note that this transformation introduces an a*b* shift to the measurements, justification for this shift and the reason for choosing the 300% ink value as the black point (rather than using the darkest measured neutral) is given in section 2.2.2.

2.2.2 Gray Axis Adjustment

Most printers use CMYK, but K has not been mentioned until now. This is because gray component replacement (GCR) is often done inside the printer or driver; it is treated as part of the printing process and the algorithm being used may not be known. However, many printers typically use some variation of 100% GCR where equal amounts of CMY are replace by K. If no CMS intervenes, an RGB gray scale image (i.e. R=G=B) will be printed using only K, which is desirable. The CMS in this case will intervene, but this particular behavior is preferably preserved for RGB gray scale images.

No attempt to fully justify this requirement is made here. If this constraint were not imposed and the system were perfectly accurate, it should be capable of printing pleasing neutrals. However, the system cannot be perfectly accurate so neutrals would be printed with some non-zero chroma. A viewer printing a gray scale image would notice these errors and find them disturbing; some tones would appear neutral, some would have a slight red cast, some a slight green cast, etc. If neutrals are printed using only K, then any color cast will be consistent over the entire gray scale and the result will be more pleasing. To do this, another transformation is applied to the measurements after both white point adjustment and black point adjustment have been done. This is called *gray axis adjustment*.

For each measured L*a*b* value and its corresponding CMY $((L,a,b), (C,M,Y))$ the following is done: If $C=M=Y$ then a and b are replaced with zero, otherwise a and b are left unchanged. Once this has been done, the measurements

- 34 - indicate that measurements of equal CMY values are neutral.

There are two pitfalls to this approach.

- It may introduce non-smoothness into the data, since local changes are made.
- It makes the data less accurate by replacing legitimate measurements with artificial ones.

The first pitfall should not pose a problem if the shifts made are small and if the CMY grid steps are large. Black point adjustment (section 2.2.1.2) should make equal CMY's nearly neutral, and black point adjustment is a global shift that does not introduce non-smoothness.

Example 1

Suppose that the printer uses 100% GCR, and suppose K is somewhat bluish. A gradation from CMY=(100%,100%,100%) to CMY=(0%,0%,0%) will be printed using only K. In $L^*a^*b^*$ space this gradation would be expected to go smoothly from white to a bluish-black color, it might not be a straight line in $L^*a^*b^*$ space but it is probably not highly curved either. If it were a straight line then the black point adjustment would change all the $L^*a^*b^*$'s of this ramp to neutral. As it is, the black point adjustment makes the gradation closer to neutral, so the subsequent gray axis adjustment should only introduce small shifts.

The second pitfall, less accurate measurements, is something that must be lived with and may be not be a liability. Perhaps the viewer adapts to black, as he does to white.

The magnitude of the local shifts that are introduced and the global shift from black point adjustment are straightforward to calculate. Should these shifts prove to be large for some particular printer, the benefits of this transformation may have to be reevaluated.

2.2.3 Data Smoothing

The "natural" behavior of ink and paper is continuous and smooth. However, a number of factors can influence this behavior, making it non-smooth or even discontinuous.

- 35 -

- Halftoning, dithering, error diffusion, etc. can introduce steps and discontinuities.
- GCR can cause non-monotonic behavior. This is especially apparent when the GCR algorithm does not preserve luminance, see section 5.2.
- Software or hardware that limits total ink coverage may introduce non-smoothness.

For reasons which will be elaborated in section 2.4, it may be desired to smooth the data. There is no strong justification for the particular smoothing technique chosen here. It is relatively simple and seems to work in practice.

Let $L$ be an $n^3$ LUT of measurements as described in section 2.1. If $n=2$, then interpolating in $L$ will give a very smooth and very inaccurate forward model. If $n$ is large then the forward model will be accurate, but measurement error or discontinuous behavior of the printer itself may cause the forward model to be non-smooth.

The smoothing algorithm is parameterized by two values, an integer $k$ and a real number $z$. $k$ must be an integral divisor of $n-1$. A new LUT of size $m^3$ is formed by sub-sampling $L$, where, $$m = \frac{n-1}{k} + 1$$

This is called LUT $L'$.

$L$ and $L'$ are averaged to form $L''$ of size $n^3$, as follows. Let $(c,m,y)$ be an entry in $L$, and let $(l,a,b)_L$ be its corresponding measurement. Let $(l,a,b)_{L'}$ be the result of interpolating $(c,m,y)$ in $L'$. The $L''$ entry for $(c,m,y)$ is given by, $$\begin{bmatrix}l\\a\\b\end{bmatrix}_{L''} = z\begin{bmatrix}l\\a\\b\end{bmatrix}_{L'} + (1-z)\begin{bmatrix}l\\a\\b\end{bmatrix}_L$$

So the larger $k$, the smoother and less accurate $L'$ will be. The larger $z$, the more weight is given to $L'$ in computing $L''$. $L''$ will be identical to $L$ if $z=0$ or if $k=1$.

- 36 -

The distribution of ΔE introduced by data smoothing is straightforward to estimate; the output of $L''$ is compared with the output of $L$ over a random sample if CMY values.

2.3 The Forward Model

To reiterate, first an evenly spaced grid of CMY is measured. Then a white point adjustment is applied to this data, followed by a black point adjustment, a gray axis adjustment, and data smoothing. The measurements are then used in a look-up table with trilinear interpolation; the combination of a LUT and interpolation can be thought of as a continuous mapping from CMY to L*a*b* and this mapping is denoted as, $$f: CMY \rightarrow L^*a^*b^*$$

Where $f$ is the *forward model* of the printer and it is illustrated in the following flow chart.

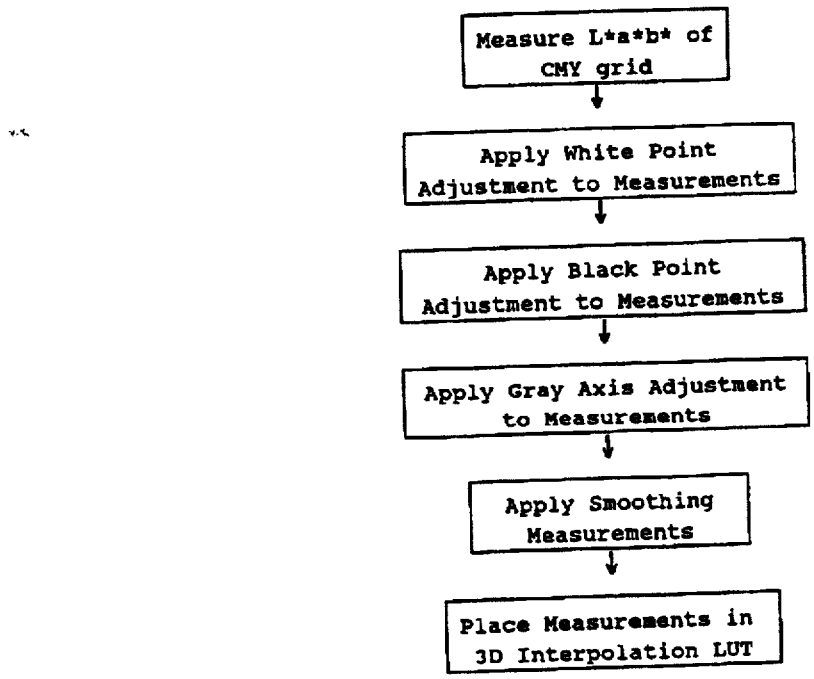

- 37 -

2.4 The Inverse Mo

The mapping from L*a*b* to CMY is denoted the *inverse model* of a printer:

$$f^{-1}: CMY \rightarrow L*a*b*$$

There is no analytical form for $f^{-1}$ so Newton's Method[1], a numerical technique for inverting a function at a point, is used. Newton's Method can fail to converge to a solution on a particular L*a*b* input for the following reasons.

- The L*a*b* value is not in the domain of $f$. (i.e. it is an out-of-gamut color for the printer in question).
- $f$ is non-monotonic. In this case Newton's method may not converge to a solution even though one may exist, or there may be multiple solutions.

It is preferable to try to avoid non-monotonic data by using the data smoothing of section 2.2.3. For some printers data smoothing is unnecessary. So far the only way to determine if data smoothing is necessary is by observation; the forward model for many L*a*b* values is inverted and the resulting CMY's are examined for noise or "holes" in the gamut.

2.4.1 Accuracy

The accuracy of the inverse model depends on the accuracy of the forward model (section 2.1.1), the error introduced by data smoothing (section 2.2.3), and the error introduced by gray axis adjustment (section 2.2.2). White and black point adjustments are not considered to introduce error, rather they are an adaptation model and should exact CIEXYZ to CIEXYZ matching be desired, these adjustments could be omitted.

Two approaches to estimating the distribution of error in the inverse model are offered. The first is to mathematically combine the errors mentioned above to form a new distribution. The advantage to this approach is that it requires no additional measurement. The disadvantage is that it is not yet known how to do this.

---

[1] Since Newton's Method is described in most basic numerical analysis texts, a description is omitted here.

- 38 -

A second approach is to generate a random set of L*a*b* values, apply the inverse model to them to get CMY values, print and measure these CMY values, and compare the measured L*a*b*s to the original set. These ΔE's approximate the distribution of error in the inverse model.

2.5 Practical Concerns

There are other approaches to constructing a forward model, such as polynomial fitting or trying to physically model a printer's color behavior. Some pros and cons of the particular method chosen here are given below.

| Pros | Cons |
| --- | --- |
| It is straight forward to implement and describe. | Data points must be on a grid, so it is not possible to concentrate more data in particular CMY regions. |
| Its error can be arbitrarily reduced by choosing a dense enough grid. | It requires a relatively large amount of data for reasonable accuracy. |
| It allows good control over the equal-CMY axis, (for gray axis adjustment). | It requires a separate and somewhat ad hoc smoothing stage. |

3. Gamut Mapping

The inverse printer model shows how to print L*a*b* values that are in-gamut. If an L*a*b* value is out-of-gamut, it must be mapped to an in-gamut color before applying the inverse model. The caveats of section 2.4 aside, it can be determined if a color is in-gamut by trying to invert the forward model for that color; if inversion converges to a solution then the color is in-gamut, otherwise it is out-of-gamut.

The particular gamut mapping algorithm chosen here is a clipping strategy, it maps out-of-gamut colors to the gamut surface. An alternative class of algorithms are "compression" strategies that map some out of gamut colors to colors that are strictly inside the gamut.

3.1 De-Saturation Gamut Mapping.

Given a target point $t=(L_t, C_t H_t)$ in LCH space, a mapping of t onto the surface of the printer gamut is defined as follows:

- 39 -

Let, $$L_t = \begin{cases} L_{min} & L_t < L_{min} \\ L_t & L_{min} \leq L_t \leq L_{max} \\ L_{max} & L_t > L_{max} \end{cases}$$

Where $L_{min}$ is the darkest in-gamut neutral, and $L_{max}$ is the lightest in-gamut neutral. All neutral colors between $L_{min}$ and $L_{max}$ are assumed to be in-gamut.[§]

The de-saturation mapping of $t$ onto the surface of the printer gamut is defined as the most chromatic in-gamut point on the line segment $\overline{(L_t, C_t, H_t)(L'_t, 0, 0)}$. This mapping is denoted as:

$$d: LCH \to CMY.$$

Subjectively speaking, $d$ is a conservative gamut mapping strategy. It preserves hue and luminance, and it is unlikely to cause artifacts in images. Furthermore, there is a smooth transition between in-gamut and out-of-gamut colors; a very important property. However, highly saturated out-of-gamut colors will be overly de-saturated by this strategy. For such colors, a strategy that preserves neither hue nor lightness may be desirable. (e.g. A strategy may be desired which maps pure monitor yellow to printer yellow, even though they have different hues and luminance's. De-saturation gamut mapping will map monitor yellow to something near white.)

3.2 N-Cone Gamut Mapping

A new gamut mapping strategy is proposed here that has the best qualities of de-saturation gamut mapping, while producing pleasing output for highly saturated out-of-gamut colors. This strategy is built around a pair of three dimensional geometric solid in LCH-space described in the following sections.

3.2.1 The N-Cone Model

Figure 16:
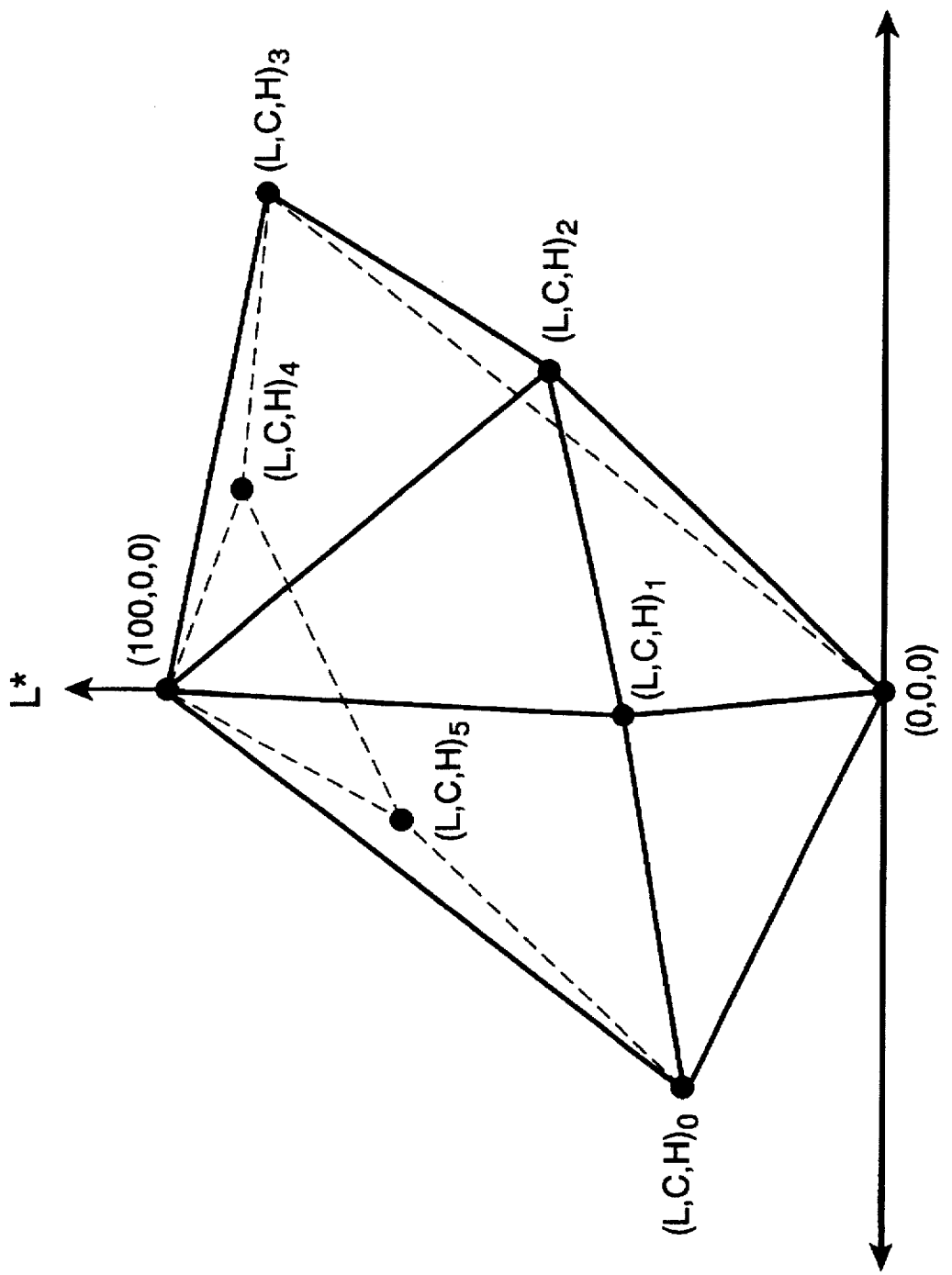
FIGS. 16 through 25 are figures referred to in the Appendix to this application.
Figure 17:
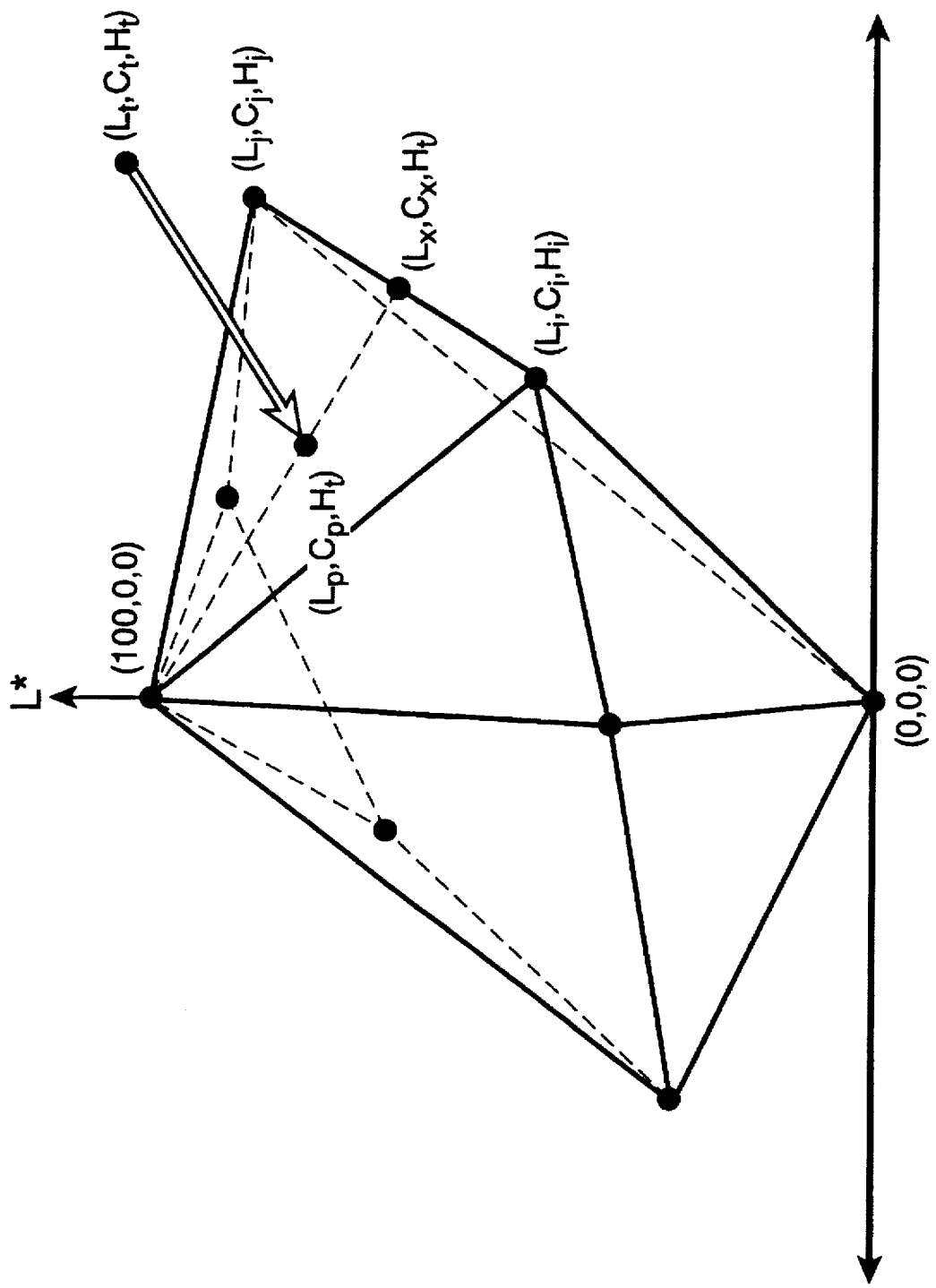

Consider the solid in LCH space shown in Figure 16, which is called an *n-cone*.

---

[§]This choice of white and black point adjustment leads to $L_{max}=100$ and $L_{min}=0$, but the definition of de-saturation gamut mapping does not depend on this property.

- 40 -

An n-cone is defined  n chromatic vertices $(L, H)_0$, $(L,C,H)_1, \ldots (L,C,H)_n$ where $H_i<H_{i+1}$. The n upper ces of the n-cone are the triangles formed by $(100,0,0)_0$, $(L,C,H)_i$, $(L,C,H)_{(i+1) \bmod n}$. The lower faces are the triangles formed by $(0,0,0)_0$, $(L,C,H)_i$, $(L,C,H)_{(i+1) \bmod n}$. So an n-cone's two non-chromatic vertices are black $(0,0,0)$ origin and white, $(100,0,0)$[1].

3.2.2 Projection of a Point On To an N-Cone

Given a target point $t=(L_t,C_t,H_t)$ in LCH space, a hue-preserving projection $p=(L_p,C_p,H_p)$ of t is defined onto a n-cone such that $H_p = H_t$.

Figure 18B:
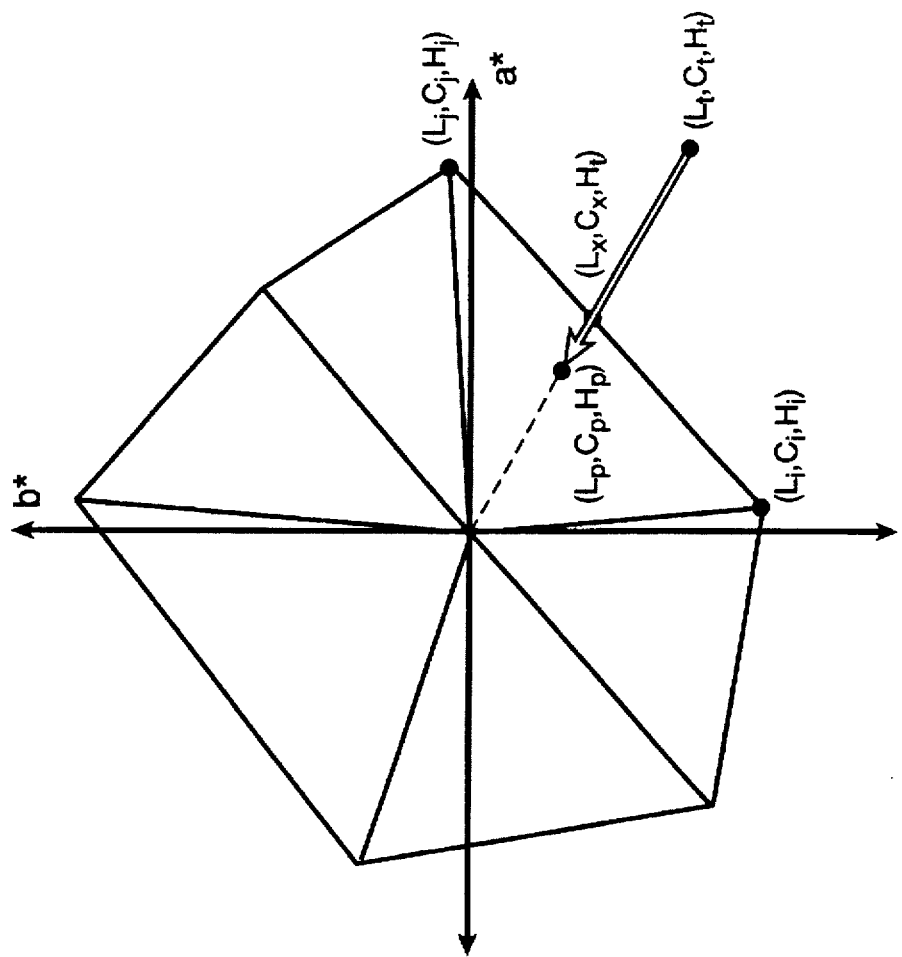
Figure 18A:
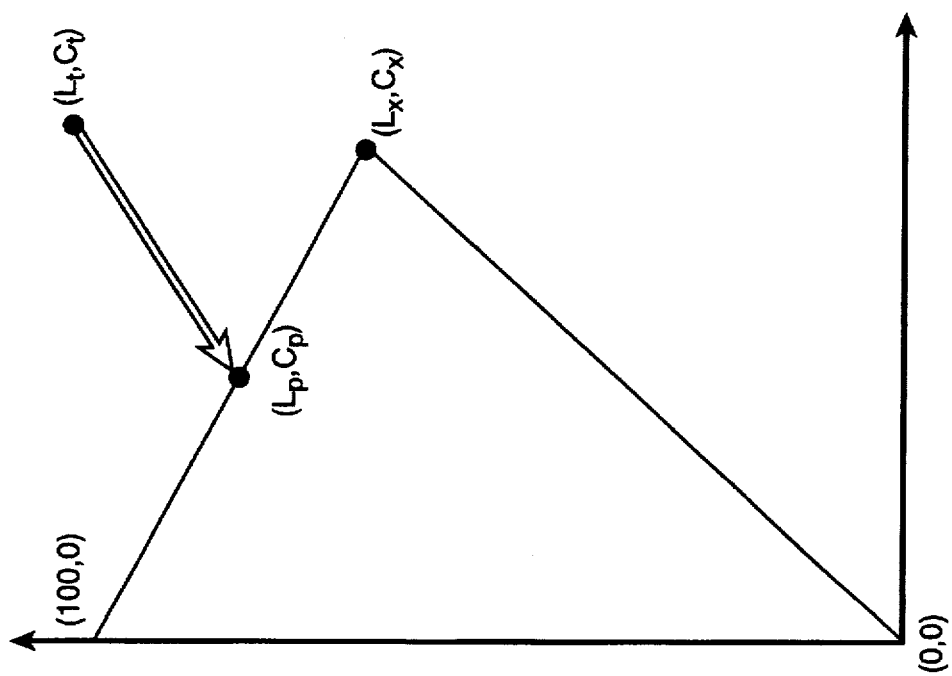

Let $(L_i,C_i,H_i)$ be the n-cone vertex clockwise-closest in hue to $H_t$, (viewed from above, see Figures 18(a) and 18(b)). Let $(L_j,C_j,H_j)$ be the n-cone vertex counterclockwise-closest in hue to $H_t$. In the degenerate case where $C_t$ is zero, $i=0$ and $j=1$.

In order to project the target onto the hexcone, the point on the line segment is defined as $\overline{(L_i,C_i,H_i)(L_j,C_j,H_j)}$ and has the same hue as the target; this point is called the *crux*.

3.2.2.1 The Crux

Let $(L_i,a_i,b_i)$ and $(L_j,a_j,b_j)$ be the L*a*b* coordinates of $(L_i,C_i,H_i)$ and $(L_j,C_j,H_j)$ respectively. The vector equation that describes the line in L*a*b* space through these two points is given by, $$\begin{bmatrix}L\\a\\b\end{bmatrix} = v\begin{bmatrix}L_j\\a_j\\b_j\end{bmatrix} + (1-v)\begin{bmatrix}L_i\\a_i\\b_i\end{bmatrix} \qquad \text{Equation 1}$$

The crux is the point $(L_x,a_x,b_x)$ on this line having $a_x/b_x = a_t/b_t$, (the target is denoted as $(L_t,a_t,b_t)$ in L*a*b* space). To find the crux, the following equation is solved for $v_x$.

---

[1] It is straightforward to extend the definition of an n-cone such that black need not be $(0,0,0)$ and white need not be $(100,0,0)$. This makes the geometry in subsequent sections somewhat more complicated.

- 41 -

$$\frac{a_t}{b_t} = \frac{v_x a_j + (1-v_x) a_i}{v_x b_j + (1-v_x) b_i}$$

to get, $$v_x = \frac{b_i a_t - a_i b_t}{b_t(a_j - a_i) - a_t(b_j - b_i)}$$

Substituting $v_x$ back into Equation 1:

$$\begin{bmatrix} l_x \\ a_x \\ b_x \end{bmatrix} = v_x \begin{bmatrix} L_j \\ a_j \\ b_j \end{bmatrix} + (1-v_x) \begin{bmatrix} L_i \\ a_i \\ b_i \end{bmatrix} \qquad \text{Equation 2}$$

The crux in LCH space is denoted as $(L_x, C_x, H_x)$ where $H_x = H_t$.

Now that the crux has been defined, a line connecting it to either the origin or (100,0,0) is defined, depending on the luminance of the target. This is called the *surface line* and the target is projected onto this line.

3.2.2.2 The Surface Line

The surface line is defined by either the line segment $\overline{(Lx,Cx,Hx)(100,0,0)}$, or the line segment $\overline{(Lx,Cx,Hx)(0,0,0)}$. Since both of these line segments are of constant hue, the surface line will be described with the following equation in LC-space.

$$L = m_s C + b_s$$

where, $$m_s = \begin{cases} \dfrac{L_x - 100}{C_x} & L_t \geq L_x \\ \dfrac{L_x}{C_x} & L_t < L_x \end{cases}$$

$$b_s = \begin{cases} 100 & L_t \geq L_x \\ 0 & L_t < L_x \end{cases}$$

The target is projected onto the surface line. The slope of the projection line, $\Delta L/\Delta C$, is determined by the luminance of the projection, and by a constant.

3.2.2.3 The Projection Line

The projection line is the line in LC space passing through the target, intersecting the surface line, and having slope and L* intercept given by the following equation:

$$L = m_p C + b_p$$

where, $$b_p = L_t - m_p C_t$$

$$m_p = \frac{(1-w)\delta + w - 1}{m_s}$$

and, $$w = \begin{cases} \dfrac{100-L_t}{100-L_x} & L_t \geq L_x \\ \dfrac{L_t}{L_x} & L_t < L_x \end{cases} \qquad \text{Equation 3}$$

and $\delta$ is a constant satisfying $0 \leq \delta \leq 1$.

In other words, the projection line is the line passing through the target with slope $m_p$, which depends on the constant $\delta$ and on the difference between the target luminance and the crux luminance.

Example 2

A value of $\delta = 1$ gives $m_p = 0$; so the projection line has a slope of zero regardless of the target luminance.

A value of $\delta = 0$ gives $(w-1)/m_s$; so the projection line has a slope of zero when the target luminance is equal to the crux luminance, and the projection line approaches orthogonality to the surface line as the
target luminance approaches either zero or 100.

In practice the optimal value for $\delta$ seems to depend on the
hue region in question, and on the gamut of the particular
printer in question. (See sections 3.2.5.2 and 3.2.7).

3.2.2.4 The Projection

Let $(L',C')$ be the intersection of the projection line and
the surface line, $$C' = \frac{b_s - b_p}{m_p - m_s}$$

$$L' = m_p \frac{b_s - b_p}{m_p - m_x} + b_p$$

The *projection* $p = (L_p, C_p, H_p)$ is given by, $$(L_p, C_p) = \begin{cases} (L', C') & C_x \geq C_p \\ (L_x, C_x) & C_x < C_p \end{cases}$$

and $H_p = H_t$.

Figure 19:
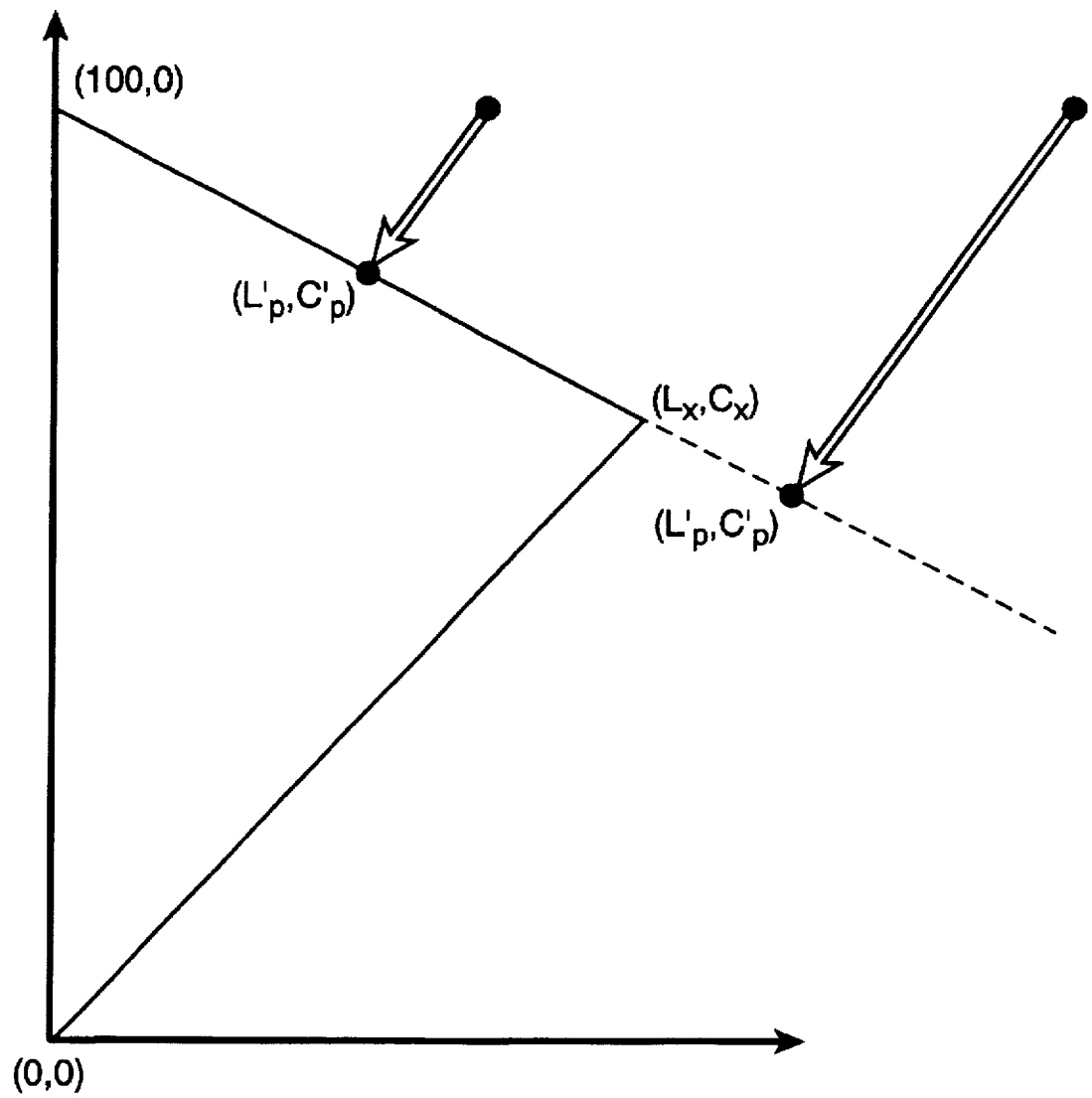

As shown in Figure 19, if $(L',C')$ lies on one of the line
segments described in section 3.2.2.2, it is the
projection. If not, the projection is defined to be
identical to the crux.

Note that the projection is well defined for all LCH
values, including those within the n-cone.

3.2.3 Modeling the Actual CMY Gamut Surface

For CMY devices the gamut surface is the following set of
colors.

$$S = \{(C,M,Y) \mid \min\{C,M,Y\} = 0\% \vee \max\{C,M,Y\} = 100\%\} \quad \textit{Equation 4}$$

That is, a CMY value is on the gamut surface if and only if one of its components is zero or one of its components is 100%. If S is measured, the L*a*b* values form a distorted cube whose eight vertices are the colors resulting from all mixtures of 0% and 100% ink; C, M, Y, C+M, C+Y, Y+M, C+M+Y, and white.

The faces and edges of this distorted cube may be concave or convex. For reasons mentioned in section 2, there may be areas of non-smoothness. It is difficult to find an analytical description of the CMY gamut in L*a*b* space that is tractable to work with. Therefore, the CMY gamut is modeled, albeit inaccurately, using an n-cone with six chromatic vertices, also know as a *hex-cone*, which will be denoted as $H_4$.

The LCH values of the vertices are chosen by selecting six combinations of CMY, and using the forward model to compute their LCH's. Typically, the CMY combinations used are, $$(C,M,Y)_0 = (100\%, 0\%, 0\%)$$
$$(C,M,Y)_1 = (100\%, 100\%, 0\%)$$
$$(C,M,Y)_2 = (0\%, 100\%, 0\%)$$
$$(C,M,Y)_3 = (0\%, 100\%, 100\%)$$
$$(C,M,Y)_4 = (0\%, 0\%, 100\%)$$
$$(C,M,Y)_5 = (100\%, 0\%, 100\%)$$

and, $$(L,C,H)_i = f(C,M,Y)_i$$

where $f$ is the forward model of the printer as described in section 2.3.

Figure 20:
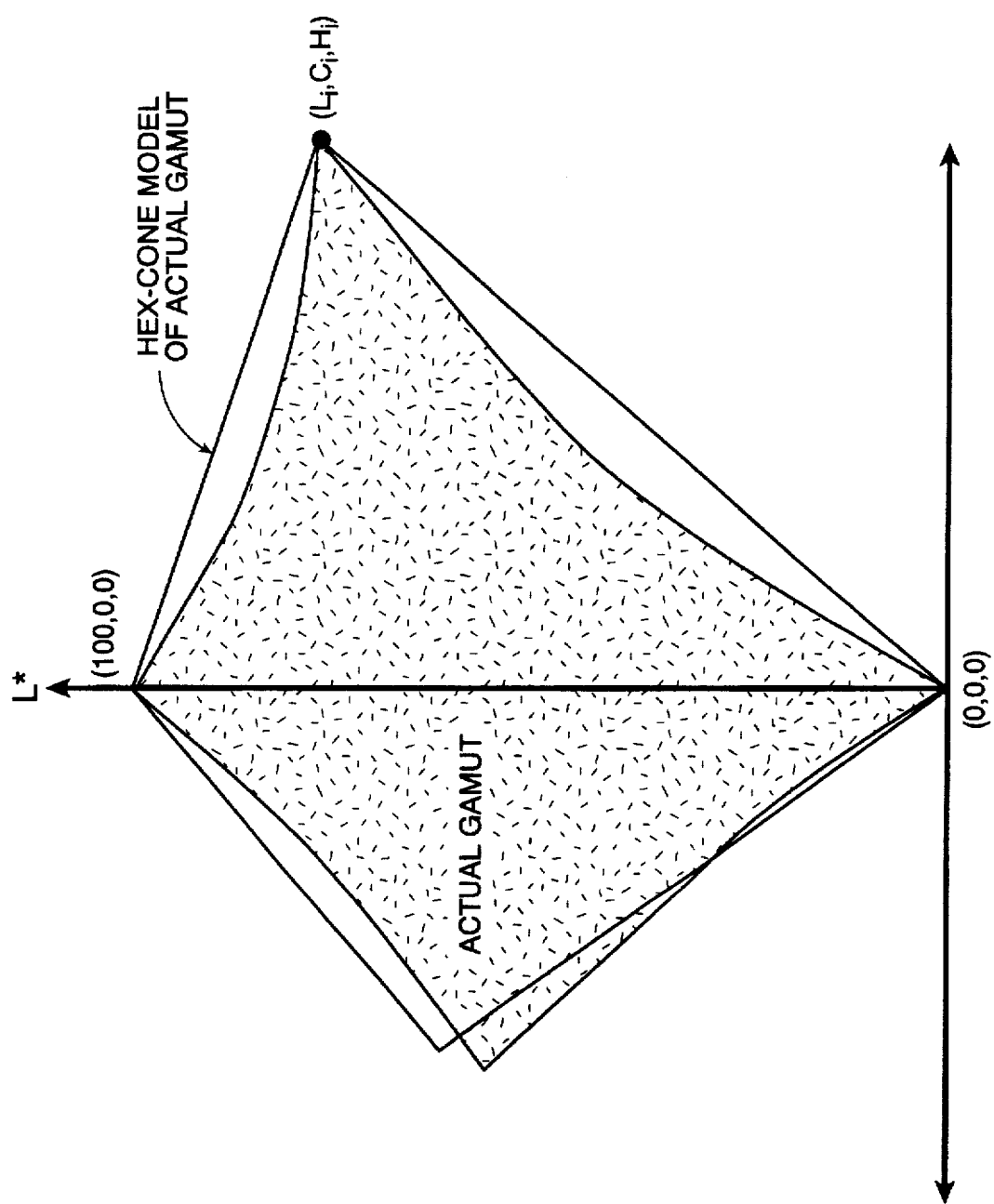

It is not necessary to use this method to specify the hex-cone coordinates. Section 3.2.7 discusses why sometimes alternative coordinates may be chosen. If the above combinations of CMY are used along with the forward model, the hexcone vertices will exactly match the corners of the actual printer gamut, and the shape of the hexcone will be a reasonable approximation to the shape of the actual gamut, (see Figure 20).

3.2.4 Modeling the Ideal CMY Gamut Surface

For the present purpose, the ideal CMY gamut would be one where that has the shape of a typical RGB monitor gamut.

- 45 -

If such a printer existed, there would be no gamut mapping problem for RGB images and a user would be able to print exactly what she saw on her screen.

The shape of a monitor gamut can be approximated using a hex-cone where the vertices are computed from the monitor's RGB primaries and secondaries. (A standard CIE *RGB→CIEXYZ→LCH* transformation is used for a "typical" RGB monitor). This is called hexcone $H_I$.

For each vertex of $H_I$ a CMY combination is chosen that is subjectively judged to be the best substitute for the RGB color. For example, it might be decided that RGB blue is best reproduced by 100%C+50%M, or that RGB green is best reproduced by 100%Y+60%C, etc. The criteria for choosing these CMY mixtures is discussed in section 3.2.7

3.2.5 Extension of the N-Cone Model

So far an n-cone has been defined as a geometric solid in LCH-space, and a strategy for projecting a point in LCH space onto the surface of an n-cone has been described. The definition of an n-cone will now be extended such that each point on its surface has additional values associated with it; a CMY value, a number called its *attenuation factor*, and a number called its *slope factor*. The original definition of the slope factor is given in section 3.2.2.3, it determines the slope of the projection line in relation to the slope of the surface line. The reasons for these extension are elaborated in section 3.2.6.

3.2.5.1 N-Cone Colorants

The colorants at each vertex of the hexcone are specified, at its origin and at white. An interpolation scheme is also specified for all other points on the n-cone. For example, the colorants of the n-cone vertices could be defined as in section 3.2.3, the colorant of the origin as (100%,100%,100%) and the colorant at white as (0%,0%,0%).

For each n-cone vertex $(L,C,H)_i$, let $(C,M,Y)_i$ be its CMY value.

The CMY of the crux, $(C,M,Y)_x$, is defined by the vector equation, $$\begin{bmatrix} C \\ M \\ Y \end{bmatrix}_x = v_x \begin{bmatrix} C \\ M \\ Y \end{bmatrix}_j + (1-v_x) \begin{bmatrix} C \\ M \\ Y \end{bmatrix}_i$$

where $v_x$ is given in Equation 2, and $i$ and $j$ are specified in section 3.2.2.

Given a surface line through crux $(L,C,H)_x$, the CMY of a point $(L_s,C_s)$ on this line is defined as, $$\begin{bmatrix} C \\ M \\ Y \end{bmatrix}_s = y \begin{bmatrix} C \\ M \\ Y \end{bmatrix}_x + (1-y) \begin{bmatrix} C \\ M \\ Y \end{bmatrix}_e$$

where, $$q_e = \begin{cases} (100\%,100\%,100\%) & L_s \geq L_x \\ (0\%,0\%,0\%) & L_s < L_x \end{cases}$$

$$y = \begin{cases} \dfrac{100-L_s}{100-L_x} & L_s \geq L_x \\ \dfrac{L_s}{L_x} & L_s < L_x \end{cases}$$

So, the top of the n-cone is white (no ink), the bottom is black (300% ink), and each vertex has a specified ink mixture. The CMY of a point on the n-cone surface is found by interpolating between surrounding vertices as described above.

3.2.5.2 N-Cone Attenuation Factors and Slope Factors

For each n-cone vertex $(L,C,H)_i$, let $a_i$ be its attenuation factor and let $\delta_i$ be its slope factor. The attenuation factor of the crux, $a_x$, is defined by the equation, $$a_x = v_x a_j + (1 - v_x) a_i$$

where $v_x$ is given in Equation 2, and $i$ and $j$ are specified in section 3.2.2. Similarly the slope factor of the crux, $\delta_x$ is defined by the equation,

- 47 -

$$\delta_x = v_x \delta_j + (1 - v_x) \delta_i$$

Given a surface line through crux $(L,C,H)_x$, the attenuation factor of any point $(L_i,C_i)$ on this line is defined to be the attenuation factor at the crux. Similarly the slope factor of any point on this line is defined to be the slope factor at the crux. In other words, the attenuation factor and the slope factor of a point on the n-cone surface depend only on the hue of the point, not on its luminance or chroma.

Section 3.2.7 describes a method for setting attenuation factors and for selecting slope factors.

3.2.6 Dual N-Cone Gamut Mapping

Given a target color $t$, its CMY value $(C,M,Y)_t$ is specified as follows.

Let $(C,M,Y)_I$ be the CMY value from projecting $t$ onto $H_I$, as described in section 3.2.5.1.

Let $a_I$ be the attenuation factor from projecting $t$ onto $H_I$, as described in section 3.2.5.1.

Let $p_A$ be the projection of $t$ onto $H_A$.

Let $r = f(d(p_A))$. i.e. $r$ is the CMY obtained by applying the de-saturation gamut mapping to $p_A$.

Two CMY values, $r$ and $(C,M,Y)_I$ are obtained. $r$ is the "conservative" value (as described in section 2.4.1). $(C,M,Y)_I$ is the value that is appropriate for fully saturated RGB colors, (as long as $H_I$'s vertexes and CMY's have been appropriately chosen). The weighted average of $r$ and $(C,M,Y)_I$ is then taken in such a way that $r$ dominates as $t$ approaches $H_A$, and $(C,M,Y)_I$ dominates as $t$ moves "sufficiently far" away from $H_A$.

Let the weight $w$ be given by, $$w = \begin{cases} \dfrac{1 - \cos\left(\dfrac{\max(0, a_I - \Delta E(t, p_A))}{a_I}\Pi\right)}{2} & C_t > C_{p_A} \\ 1 & C_t \leq C_{p_A} \end{cases} \quad \text{Equation 5}$$

- 48 - using $w$ to calculate the weighted average described above, $$\begin{bmatrix} C \\ M \\ Y \end{bmatrix}_{t'} = wr + (1-w) \begin{bmatrix} C \\ M \\ Y \end{bmatrix}_{t} \qquad \text{Equation 6}$$

Finally, allowing for the possibility that either $r$ or $(C,M,Y)_t$ has a component that is greater than 100%.

$$\begin{bmatrix} C \\ M \\ Y \end{bmatrix}_{t} = \max\left\{ \begin{bmatrix} 0 \\ 0 \\ 0 \end{bmatrix}, \begin{bmatrix} C \\ M \\ Y \end{bmatrix}_{t'} - \max(0, \max(C_{t'}, M_{t'}, Y_{t'}) - 100\%) \right\} \quad \text{Equation 7}$$

$(C,M,Y)_t$ is the result of the dual n-cone gamut mapping applied to the target point $t$.

Figure 21:
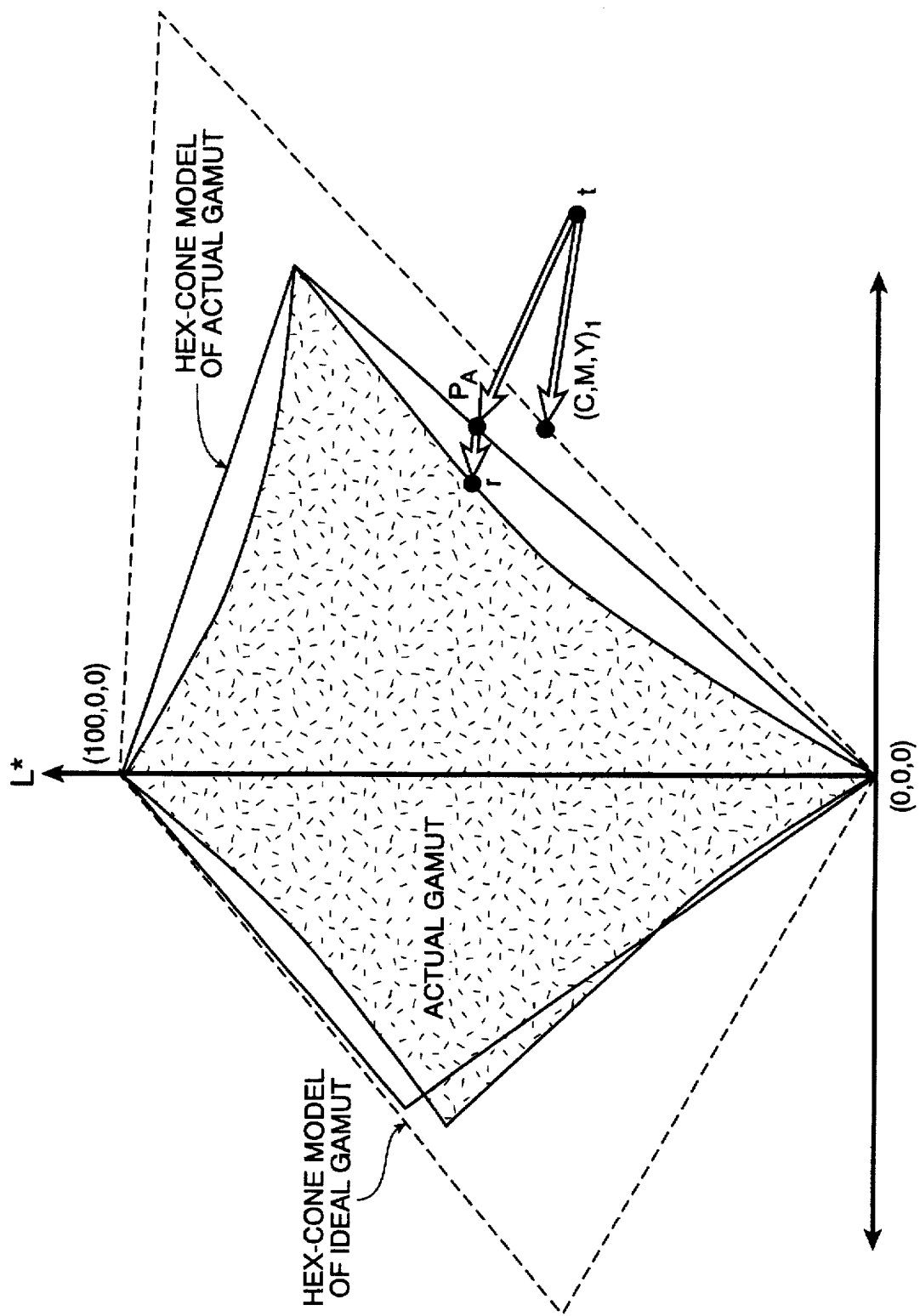
Figure 22:
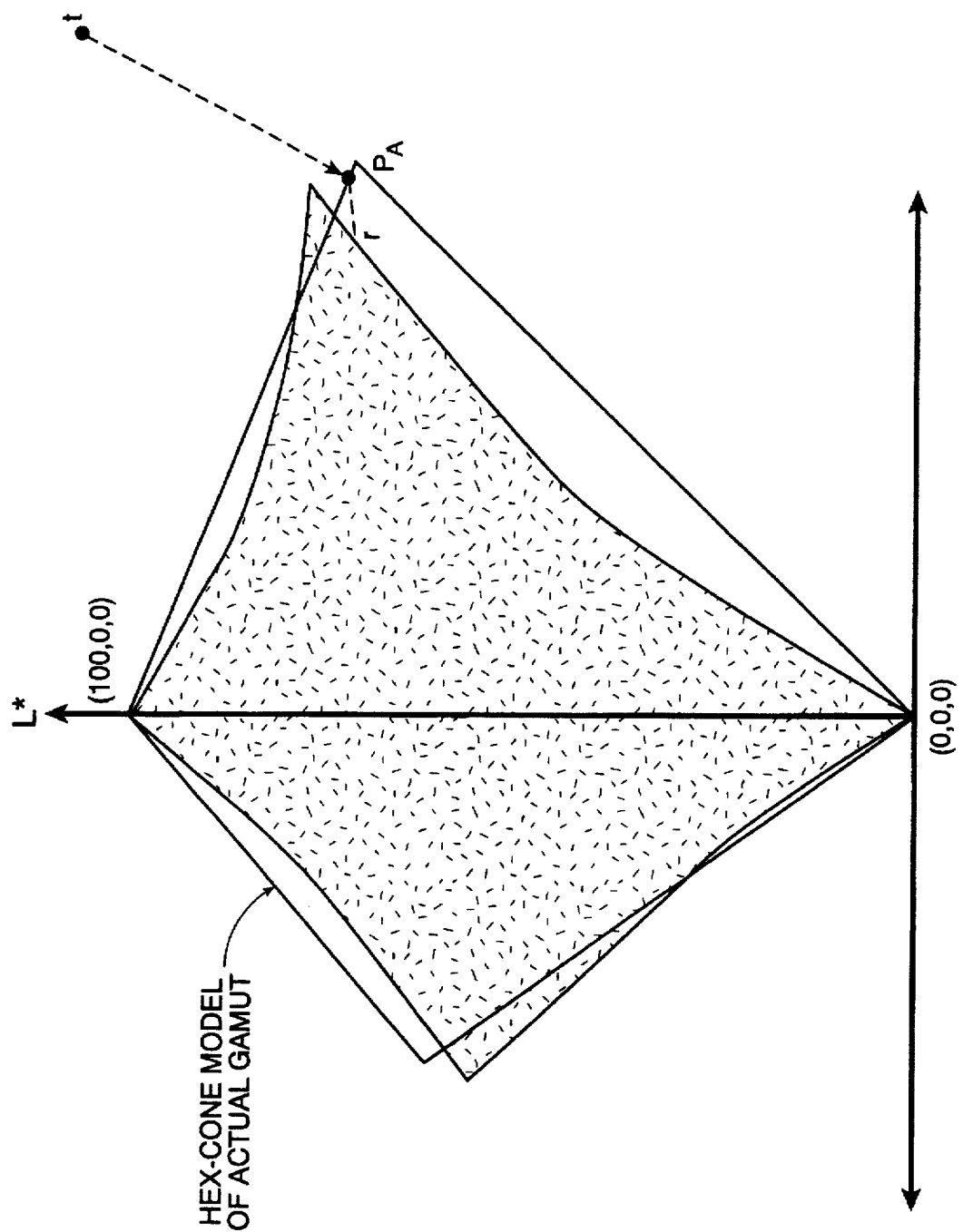

So, for colors far from the printer gamut the final CMY is determined by the ideal n-cone. As the actual n-cone is approached, the direction of the projection becomes more and more influenced by the actual n-cone. However, the actual n-cone does not contribute a CMY value; the CMY value comes by de-saturating the projection onto the actual n-cone until an in-gamut color is found, as shown in Figure 21. Why de-saturate rather than continue in the direction of the projection onto the actual n-cone? In some cases, the projection line might not intersect the true gamut at all. Figure 22 illustrates a case where the projection line fails to intersect the true printer gamut.

3.2.7 Setting N-Cone Parameters

An n-cone is parameterized by the following values,

- The number of chromatic vertices.
- The CMY of each vertex.
- The coordinates of each vertex.
- The attenuation factor of each vertex.
- The slope factor of each vertex.

A simple first try at these settings are given in Table 1.

- 49 -

| | Actual N-Cone | Ideal N-Cone |
|---|---|---|
| Number of chromatic vertices | 6 | 6 |
| CMY of chromatic vertices | $(C,M,Y)_0 = (100\%,0\%,0\%)$<br>$(C,M,Y)_1 = (100\%,100\%,0\%)$<br>$(C,M,Y)_2 = (0\%,100\%,0\%)$<br>$(C,M,Y)_3 = (0\%,100\%,100\%)$<br>$(C,M,Y)_4 = (0\%,0\%,100\%)$<br>$(C,M,Y)_5 = (100\%,0\%,100\%)$ | $(C,M,Y)_0 = (100\%,0\%,0\%)$<br>$(C,M,Y)_1 = (100\%,100\%,0\%)$<br>$(C,M,Y)_2 = (0\%,100\%,0\%)$<br>$(C,M,Y)_3 = (0\%,100\%,100\%)$<br>$(C,M,Y)_4 = (0\%,0\%,100\%)$<br>$(C,M,Y)_5 = (100\%,0\%,100\%)$ |
| LCH of chromatic vertices | Computed from the above CMY's using the forward model | Each vertex has the coordinates of the appropriate RGB primary or secondary, converted to LCH, (based on some "standard" RGB color space). |
| Attenuation factor of chromatic vertices | All set to zero. | For each vertex, the ΔE between the LCH coordinates of the vertex and the it's projection onto the actual n-cone. |
| Slope factor of chromatic vertices | All set to zero. | All set to zero. |

Table 1

- 50 -

| Pros of Table 1 | Cons of Table 1 |
|---|---|
| The Actual N-Cone is a reasonably good approximation of the true gamut shape, since its vertices match the natural "corners" of the gamut. | Monitor blue is mapped to 100%C+100%M, which appears purple. |
| Monitor red, cyan, magenta, and yellow are mapped to their corresponding printer solids. | Monitor green is mapped to 100%C+100%Y, which is much darker and less yellow than monitor green. |
|  | A gradation from monitor green to monitor black will be reproduced such that the middle of the gradation is lighter than either end point. (See Note 1 below.) |
|  | A gradation from a monitor primary to black can be reproduced with a sharp step. This is particularly likely to happen for a blue to black gradation. (See Note 2 below.). |
|  | Undesirable lightness shifts may be noticed for near-gamut colors, especially pink since it appears in flesh tones. (See Note 3 below). |

Note 1: A gradation from monitor green to monitor black will become non-monotonic with respect to luminance. This is because one endpoint is mapped to CMY=(100%, 0%, 100%), which is much darker than monitor green. However, as the gradation approaches black, it moves closer to the actual gamut, so $w$ of Equation 5 approaches 1. As $w$ approaches 1 more weight is given to $r$, the CMY of the projection onto the actual n-cone, and $r$ maintains the luminance of the input color. In other words, the green endpoint is mapped to a much darker color with no regard for its luminance, but as black is approached, the luminance of the input is taken into account, and this is what causes the non-monotonicity.

Note 2: Consider a CMY gradation from CMY=(100%, 100%, 0%) to CMY=(100%, 100%, 100%). As yellow is added to the blue solid, the gradation becomes monotonically darker and less chromatic.

However, the same gradation after application of 100% GCR goes from CMYK=(100%,100%,0%,0%) to CMYK=(0%,0%,0%,100%), (see section 5.2). Consider a point along the original CMY gradation CMY=(100%,100%, 10%). After GCR this will become CMYK=(90%, 90%, 0%, 10%). This CMYK may be lighter than the original CMY, i.e. the addition of 10%K does not make up for the reduction of 10%C and 10%M.

Figure 23:
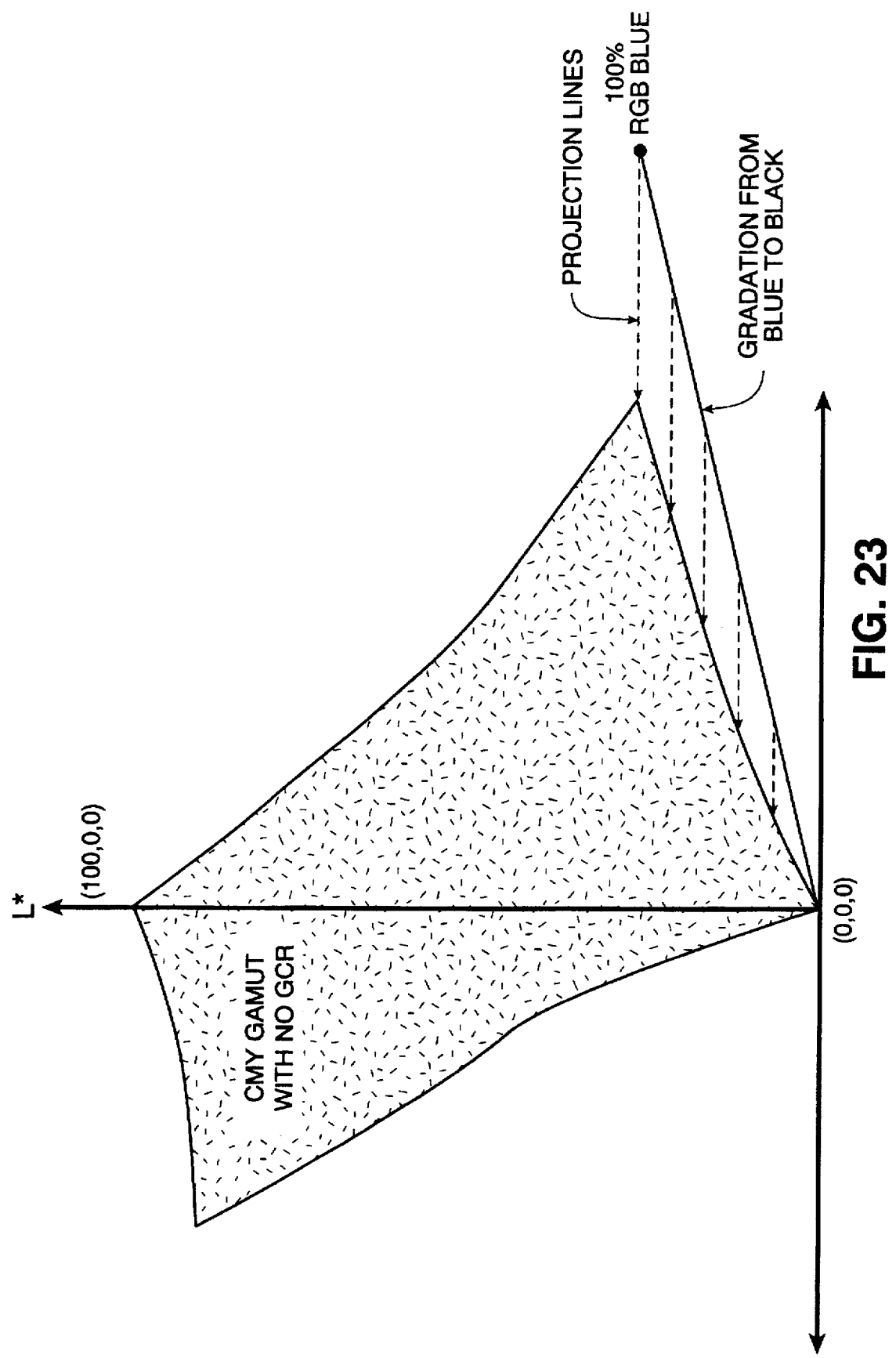
Figure 24:
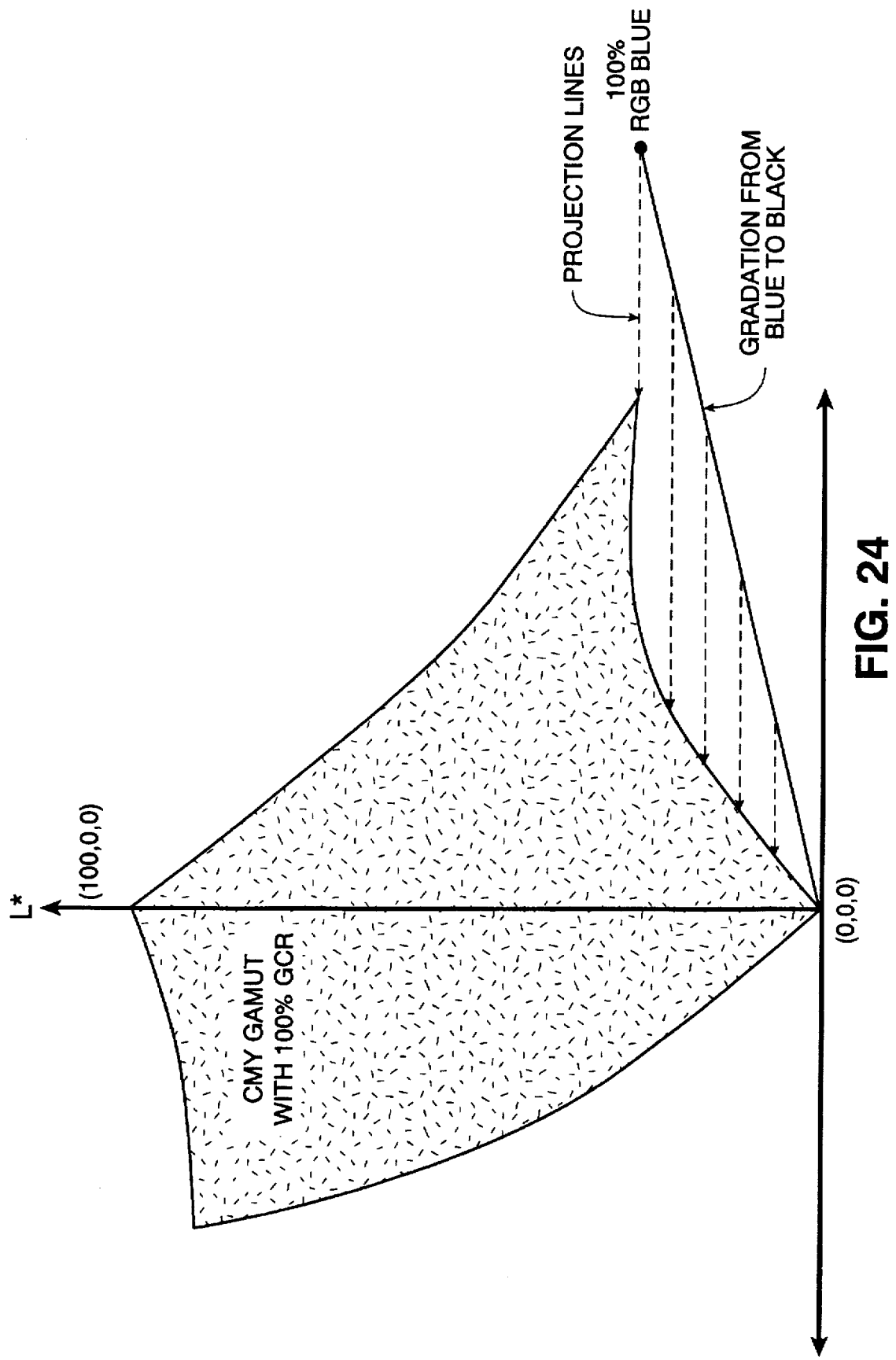

Figure 23 shows a slice of a CMY gamut at the hue of monitor blue. Figure 24 shows the same gamut after 100% GCR has been applied. Note the concavity in the blue to black region. A gradation from RGB blue to black[†] is shown in both figures, along with the projection lines that result from gamut mapping. In Figure 23 the projection points shown are relatively evenly spaced and the luminance is decreasing at a constant rate. However, in Figure 24 the projection of pure blue is quite far from the projection of a slightly darker color along the gradation. The result is that after gamut mapping, the gradation will be highly saturated at the blue end, and will abruptly become much less chromatic as it goes to the black end, resulting in a distinctly visible step.

Note 3: Lightness shifts for near-gamut colors can be caused by the slope factors being set to zero; a zero slope factor causes projection lines not to be of constant luminance, (see Example 2). Sometimes this can be desirable, because it helps maintain the saturation of the original color. However it has been found that for some printers this can cause problems reproducing flesh tones; out-of-gamut pink colors are made darker and this can be objectionable.

Table 2 is designed to avoid some of the drawbacks of Table 1.

---

[†] If a gradation is defined in RGB-space going from blue to black, it will not have constant LCH hue. However the LCH hue differences along the gradation are small.

- 52 -

| | Actual N-Cone | Ideal N-Cone |
|---|---|---|
| Number of chromatic vertices | 6 | 6 |
| CMY of chromatic vertices | $(C,M,Y)_0$ = (100%,0%,0%)<br>$(C,M,Y)_1$ = (80%,80%,0%)<br>$(C,M,Y)_2$ = (0%,100%,0%)<br>$(C,M,Y)_3$ = (0%,80%,80%)<br>$(C,M,Y)_4$ = (0%,0%,100%)<br>$(C,M,Y)_5$ = (80%,0%,80%) | $(C,M,Y)_0$ = (100%,0%,0%)<br>$(C,M,Y)_1$ = (100%,50%,0%)<br>$(C,M,Y)_2$ = (0%,100%,0%)<br>$(C,M,Y)_3$ = (0%,100%,100%)<br>$(C,M,Y)_4$ = (0%,0%,100%)<br>$(C,M,Y)_5$ = (80%,0%,100%) |
| LCH of chromatic vertices | Computed from the above CMY's using the forward model | Each vertex has the coordinates of the appropriate RGB primary or secondary, converted to LCH, (based on some "standard" RGB color space). |
| Attenuation factor of chromatic vertices | All set to zero. | For each vertex, the ΔE between the LCH coordinates of the vertex and its projection onto the actual n-cone. |
| Slope factor of chromatic vertices | $\delta_0, \delta_1, \delta_5$ = 0<br>$\delta_2, \delta_4$ = ½<br>$\delta_3$ = 1 | All set to 1. |

Table 2

Note that the particular CMY values in Table 2 are examples, the optimal choices will differ from one printer to the next.

- 53 -

| Pros of Table 2 | Cons of Table 2 |
|---|---|
| Monitor red, cyan, magenta, and yellow are mapped to their corresponding printer solids. | The Actual N-Cone is not the best approximation of the true gamut, since some of it's vertices are not printer solids. This means that some in-gamut L*a*b* color will not be reproduced accurately. The L*a*b* of 100%C+100%M for example. |
| Monitor blue is mapped to 100%C+50%M, which is a more desirable gamut mapping than from Table 1. | A gradation from monitor green to monitor black will be reproduced such that the middle of the gradation is lighter than either end point. (See Note 1 below.) |
| Monitor green is mapped to 100%C+50%Y, which is a more desirable gamut mapping than from Table 1. | There are some in-gamut colors that cannot be produced by any input, such as 100%C+100%M, or 100%C+100%Y. |
| Gradations from monitor primaries to black are reproduced smoothly, with no visible steps. This is particularly likely to happen for a blue to black gradation. (See Figure 25) | |
| Reproduction of near-gamut pink colors in flesh tones is improved. | |

Table 2 solves many of the problems of Table 1, but it introduces some new problems. In particular, the inability to reproduce some highly saturated in-gamut colors like 100%C+100%M or 100%C+100%Y. Table 3 addresses this particular problem by adding two vertices to the ideal n-cone, one for printer blue and one for printer green.

- 54 -

| | Actual N-Cone | Ideal N-Cone |
|---|---|---|
| Number of chromatic vertices | 6 | 8 |
| CMY of chromatic vertices | Same as Table 2. | $(C,M,Y)_0 = (100\%,0\%,0\%)$<br>$(C,M,Y)_1 = (100\%,50\%,0\%)$<br>$(C,M,Y)_2 = (100\%,100\%,0\%)$<br>$(C,M,Y)_3 = (0\%,100\%,0\%)$<br>$(C,M,Y)_4 = (0\%,100\%,100\%)$<br>$(C,M,Y)_5 = (0\%,0\%,100\%)$<br>$(C,M,Y)_6 = (100\%,0\%,100\%)$<br>$(C,M,Y)_7 = (100\%,0\%,50\%)$ |
| LCH of chromatic vertices | Same as Table 2. | Vertices 0,1,3,4,5, and 7 have the coordinates of the appropriate RGB primary or secondary, as in Table 2.<br><br>Vertex 2 is half way between vertices 1 and 3.<br><br>Vertex 6 is half way between vertices 6 and 7. |
| Attenuation factor of chromatic vertices | Same as Table 2. | Same as Table 2. |
| Slope factor of chromatic vertices | Same as Table 2. | Same as Table 2. |

Table 3

| Pros of Table 3 | Cons of Table 3 |
|---|---|
| All pros of Table 2 | The Actual N-Cone is not the best approximation of the true gamut, since some of its vertices are not printer solids. This means that some in-gamut L*a*b* color will not be reproduced accurately. The L*a*b* of 100%C+100%M for example. |
| | A gradation from monitor green to monitor black will be reproduced such that the middle of the gradation is lighter than either end point. |
| | A gradation from RGB yellow to RGB green will contain 100%C+100%Y, which may be objectionable. This may be avoidable by choosing better LCH coordinates for the ideal n-cone vertex corresponding to 100%C+100%Y. |

Figure 25:
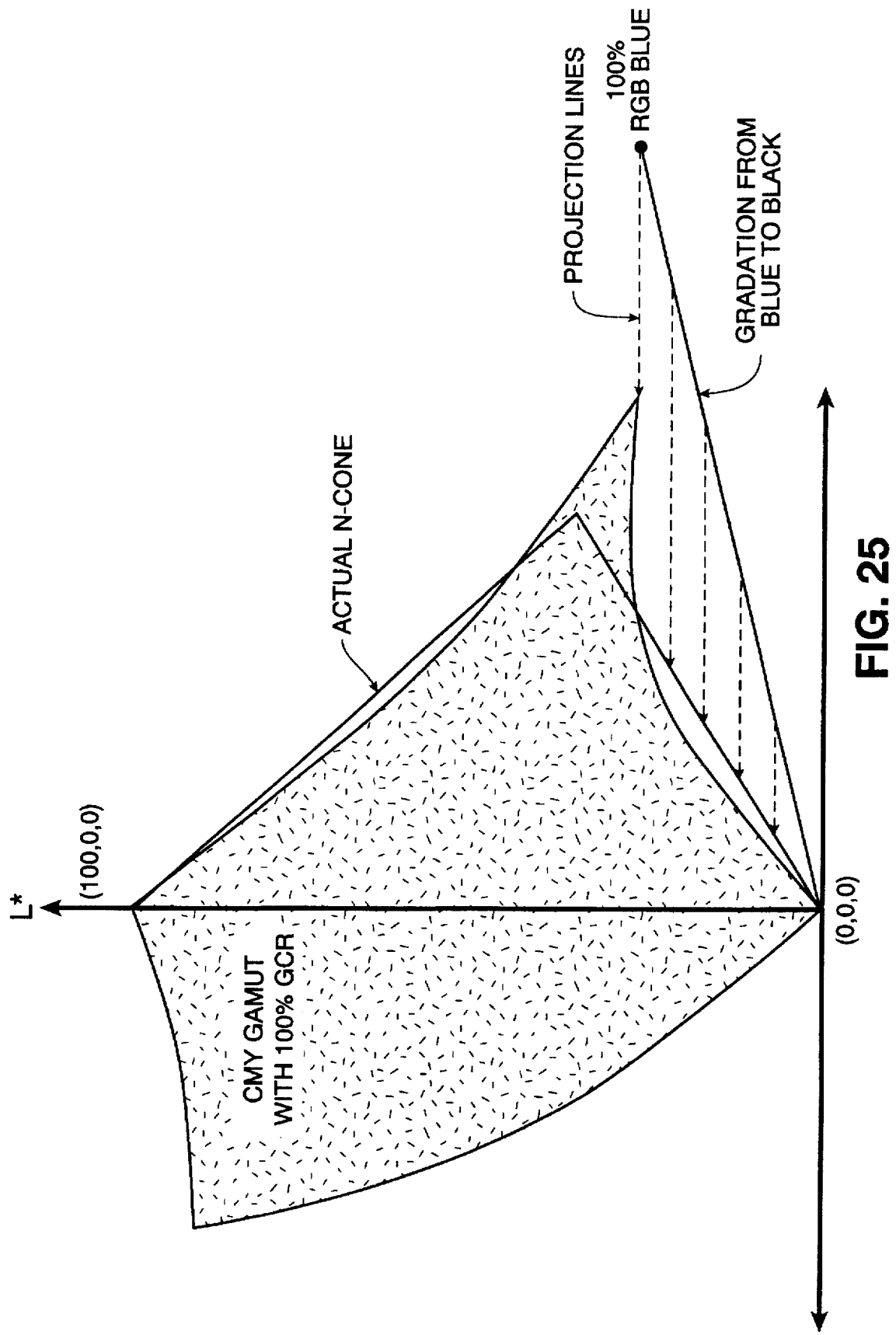

Figure 25 shows the actual n-cone of Table 3 superimposed over Figure 24. The blue-to-black gradation is projected onto this n-cone thus avoiding the discontinuity caused by the concavity of the true gamut at this hue.

3.2.8 Artifacts

3.2.9 Saturation

3.2.10 Near-Gamut colors

3.3 Summary

An out-of-gamut color is projected onto both the ideal hexcone and the actual hexcone. The projection onto the actual hexcone is taken de-saturated until an in-gamut color is found. The weighted average of this in-gamut CMY is then taken with the CMY of the ideal projection, and this is the result of the gamut mapping.

- 56 -

4. The Separation Look-up Table

It is too computationally costly to invert the forward model and compute the dual n-cone gamut mapping for each color in an image. A separation LUT is an efficient approximation to this, and the errors it introduces are straightforward to calculate. It is important to keep in mind that the <u>only</u> job of the LUT is approximate the inverse model and the gamut mapping function; the LUT cannot compensate for errors or non-smoothness in either of these functions. An infinitely dense LUT would, by definition, be perfect.

4.1 Accuracy

The accuracy discussion of section 2.1.1 is relevant here. Since the separation table is meant to approximate the inverse model and the gamut mapping algorithm, a random sample of L*a*b* colors can be taken and interpolated in the LUT to get one set of CMY, the gamut mapping algorithm and inverse model can be applied to get a second set of CMY, and these two sets of CMY can be compared. The forward model is used to convert both sets of CMY to L*a*b* and to compute $\Delta E$'s. However, the distribution of $\Delta E$'s is not all the information wanted.

Another more instructive approach is to divide the input L*a*b* values into four classes and determine the $\Delta E$ distribution within each class. To do this, it is not possible to start with a random input set since two of the below classes are two dimensional spaces.

- L*a*b*s on the neutral axis.
- L*a*b*s on the gamut surface.
- In-gamut L*a*b*s not on the neutral axis and not on the gamut surface.
- Strictly out-of-gamut L*a*b*s.

Each of these classes is important, but each class may not be given equal weight in determining the overall quality of a LUT.

Note that the $\Delta E$'s computed are not between the input color and the measured CMY, (if they were to be printed, that is). Only the difference between the LUT and the continuous system it approximates is calculated.

- 57 -

4.1.1 Surface Colors

Surface colors, as described in Equation 4, are particularly difficult to reproduce accurately using a LUT. The LUT cube in which a surface color lies will have some in-gamut corners and some out-of-gamut corners. So the resulting CMY will not be a surface color and will therefore be under saturated. This is particularly problematic for yellow.

If a user wishes to print CMYK yellow with no other inks, she will find even small contamination by C, M, or K objectionable. This is less true of other colors, for example the unwanted addition of 2% magenta to a pure cyan would be difficult to see.

A solution has not been proposed to this particular dilemma; the denser the LUT the less problematic it will be.

4.2 Smoothness

The process of sampling the continuous system in order to build a LUT should not introduce any additional non-smoothness. However, it is difficult to determine how smooth the continuous system itself is and non-smoothness there might only show up in constructing a LUT. To date, no analytical measure of smoothness is known. Layers of a LUT can be viewed as CMY images and visually examined for artifacts. Tracing the origin of such artifacts is an exercise in detective work. Sometimes, sad to say, such artifacts are found but they cannot be corrected at their source in the continuous system. For this reason the technique of section 4.3 is described.

4.3 LUT Smoothing

A local relaxation and shift is applied to a LUT, parameterized by the following values.

n, the neighborhood to use for relaxation
$(L,a,b)_c$ the center of the local relaxation area
r, the radius of the local relaxation area
w, the weight of the smoothing.

- 58 -

4.4 Index Spaces and LUT Interpolation

Some pros and cons of two commonly used index spaces with respect to the above criteria, CIE RGB and L*a*b* are listed below.

| Pros of RGB Index Space | Cons of RGB Index Space |
|---|---|
| If the index space matches the RGB space of an input image, then pure monitor primaries and secondaries will fall on LUT vertices, so their reproduction not be subject to interpolation error. This is particularly nice for images containing computer generated colors | Few, or perhaps no, CIE RGB spaces enclose the gamuts of all reasonable printers and monitors. Therefore a candidate RGB space must be extended, which complicates the system. |
| RGB indexing works well with tetrahedral interpolation, which is efficient. | RGB indexing will not work well with trilinear interpolation. The neutral axis of an RGB table is diagonal and trilinear interpolation will result in vertices off the diagonal affecting interpolation on the diagonal. |
| Even an extended RGB space will probably result in a LUT with more in-gamut entries than a comparable L*a*b* LUT. This may or may not lead to smaller interpolation errors, but it will probably improve reproduction of surface colors. | |

| Pros of L*a*b* Index Space | Cons of L*a*b* Index Space |
|---|---|
| L*a*b* encloses the gamut of any printer or monitor. | RGB primaries and secondaries will always be interpolated colors. |
| L*a*b* indexing works well with both trilinear interpolation and tetrahedral interpolation. | L*a*b* indexing wastes space, since there are many L*a*b* colors that will not be addressed by any RGB input. In fact, there are many L*a*b* colors that have no physical meaning, (e.g. L*a*b*=(100, 20, 0)). |

- 59 -

All of the above pros and cons, with the exception of the reproduction of RGB primaries and secondaries, can be seen as trade offs between size, and accuracy. That is, given an RGB LUT a superior L*a*b* LUT can always be constructed if it is made large enough, and the converse is also true.

5. Additional Topics

5.1 Monitor Matching

One goal of this system is to provide monitor-to-print matching. This has been achieved in a _highly_ controlled viewing environment, where the viewing illuminant and the monitor white point are both D65. It was necessary to adjust the monitor's white point using a more sophisticated instrument than those typically sold for monitor "calibration". Results without this careful calibration were not acceptable.

In theory, white point adjustment should lead to a _perceptual_ match between print and monitor even when their white points differ. In practice this has not been found to work very well. This indicates that the present adaptation model is deficient, (the adaptation model is nothing more than white and black point adjustment). More sophisticated adaptation models exist and this is a potential area for future improvements.

5.2 GCR

As noted in section 2.2.2 most printers have built-in GCR. A CMY printer has certain properties that are relied upon to some degree. For example, given two CMY values $(C_0, M_0, Y_0)$, $(C_1, M_1, Y_1)$ and their corresponding L*a*b* values $(L_0, a_0, b_0)$, $(L_1, a_1, b_1)$, $$(C_0 \leq C_1 \wedge M_0 \leq M_1 \wedge Y_0 \leq Y_1) \Rightarrow (L_0 \geq L_1) \qquad \text{Equation 8}$$

is expected. That is, an increase in ink leads to a decrease in L*.

However, GCR can cause the implication of Equation 8 to be false.

- 60 -

Example 3

Consider a simple GCR algorithm where K = min{C,M,Y}, and K is removed from CMY, this is sometimes referred to as 100% GCR. CMY = (100%,100%,20%) is *darker* than CMY = (100%,100%,0%), but after GCR, CMYK = (80%,80%,0%,20%) might be *lighter* than CMYK = (100%,100%,0%,0%). So this GCR algorithm has made the printer behave in a somewhat "unnatural" manner.

This can cause problems inverting the forward model and with gamut mapping, see Figure 24. In practice, the GCR algorithm of the previous example has not been seen to lead to such problems, however, more complicated GCR algorithms have been seen to lead to problems.

What is claimed is:

1. A color printer driver for a printer, comprising:
    a reproduction look-up table (LUT) which, for each of plural colors both in-gamut and out-of-gamut of the printer, stores color component values for printing by the printer; and
    means, responsive to a command to print a color, for outputting color component values stored in said reproduction LUT in correspondence to the commanded color;
    wherein for close-in out-of-gamut colors, said reproduction LUT stores perceptually matched color component values, for far-out-of-gamut colors, said reproduction LUT stores saturation matched color component values, and for intermediate out-of-gamut colors, said reproduction LUT stores color component values corresponding to a smooth blending of perceptually matched color component values and saturation matched color component values.

2. An apparatus according to claim 1, wherein for in-gamut colors said reproduction LUT stores colorimetrically matched color component values.

3. An apparatus according to claim 1, wherein for intermediate out-of-gamut colors said reproduction LUT stores a weighted average of perceptually matched color component values and saturation matched color component values.

4. An apparatus according to claim 3, wherein the weighted average is weighted in accordance with a measure of distance of the out-of-gamut color from a gamut of the printer.

5. An apparatus according to claim 1, wherein the printer driver is stored on a computer readable media.

6. An apparatus for color printing comprising:
    a color printer for printing color images in response to color component values, said color printer having a gamut of printable colors;
    a color monitor for displaying colors within a gamut of displayable colors;
    a processing unit including a computer for executing stored program process steps, said processing unit including a color monitor interface for providing color primary values to said color monitor and a color printer interface for providing color component values to said color printer; and
    a memory for storing process steps for execution by said processing unit;
    said process steps including (a) steps which together comprise an application program for deriving a color image and for displaying and printing the derived color image, (b) steps which together comprise a monitor driver for providing color primary values to said color monitor interface in response to display of the color image by said application program, and (c) steps which together comprise a color printer driver for providing color component values to said color printer interface in response to printing by said application program, wherein for in-gamut colors colorimetrically matched color component values are provided, for close-in-out-of-gamut colors perceptually matched color component values are provided, for far-out-of-gamut colors saturation matched color component values are provided, and for intermediate out-of-gamut colors color component values corresponding to a smooth blending of perceptually matched color component values and saturation matched color component values are provided.

7. An apparatus according to claim 6, wherein said printer driver includes a reproduction look-up table (LUT) in which for in-gamut colors said reproduction LUT stores the colorimetrically matched color component values.

8. An apparatus according to claim 6, wherein said printer driver includes a reproduction look-up table (LUT) in which for intermediate out-of-gamut colors said reproduction LUT stores a weighted average of perceptually matched color component values and saturation matched color component values.

9. An apparatus according to claim 8, wherein the weighted average is weighted in accordance with a measure of distance of the out-of-gamut color from a gamut of the color printer.

10. An apparatus according to claim 6, wherein the color printer driver is stored on a computer readable media.

11. A color printer driver which outputs color component values for printing by a printer, said color printer driver comprising:
    a reproduction look-up table (LUT) which, for each of plural colors both in-gamut and out-of-gamut of the printer, stores color component values for printing by the printer; and
    means, responsive to a command to print a color, for outputting color component values stored in said reproduction LUT in correspondence to the commanded color;
    wherein for out-of-gamut colors said reproduction LUT stores color component values obtained by dual-cone gamut mapping in which an actual cone of N-cone arranged surfaces is defined which mimics an actual gamut of the printer, in which an ideal cone of M-cone arranged surfaces is defined which mimics an ideal gamut, in which a target out-of-gamut color is projected onto the actual cone and de-saturated until in-gamut color component values are obtained, in which the same target color is projected onto the ideal cone to obtain fully-saturated color component values, and in which a weighted average is obtained of the in-gamut color component values and the fully-saturated color component values, weight being based on a measure of distance between the out-of-gamut target color and its projection onto the actual cone.

12. An apparatus according to claim 11, wherein for in-gamut colors said reproduction LUT stores colorimetrically matched color component values.

13. An apparatus according to claim 11, wherein projection of the out-of-gamut target color is at a slope which varies, the variation in slope being based at least on a difference in luminance between the target color and a crux of the cone-arranged surfaces.

14. An apparatus according to claim 13, wherein projection of the out-of-gamut target color is also based on a slope factor which is varied based on chromatic vertices of the cone-arranged surfaces and hue of the target color.

15. An apparatus according to claim 11, wherein weighting is based on Euclidean distance between the out-of-gamut target color and the target color projected onto the actual cone.

16. An apparatus according to claim 15, wherein weighting is also based on an attenuation factor which is varied based on chromatic vertices of the cone-arranged surfaces and hue of the target color.

17. An apparatus according to claim 11, wherein the printer driver is stored on a computer readable media.

18. An apparatus for color printing comprising:
    a color printer for printing color images in response to color component values, said color printer having a gamut of printable colors;

a color monitor for displaying colors within a gamut of displayable colors;

a processing unit including a computer for executing stored program process steps, said processing unit including a color monitor interface for providing color primary values to said color monitor and a color printer interface for providing color component values to said color printer;

a memory for storing process steps for execution by said processing unit;

said process steps including (a) steps which together comprise an application program for deriving a color image and for displaying and printing the derived color image, (b) steps which together comprise a monitor driver for providing color primary values to said color monitor interface in response to display of the color image by said application program, and (c) steps which together comprise a color printer driver for providing color component values to said color printer interface in response to printing by said application program, said color printer driver including a reproduction look-up table (LUT) which, for each of plural colors both in-gamut and out-of-gamut of the printer, stores color component values for printing by said printer, wherein for out-of-gamut colors said reproduction LUT stores color component values obtained by dual-cone gamut mapping in which an actual cone of N-cone arranged surfaces is defined which mimics the actual gamut of the printer, in which an ideal cone of M-cone arranged surfaces is defined which mimics the gamut of the color monitor, in which a target out-of-gamut color is projected onto the actual cone and de-saturated until in-gamut color component values are obtained, in which the same target color is projected onto the ideal cone to obtain fully-saturated color component values, and in which a weighted average is obtained of the in-gamut color component values and the fully-saturated color component values, weight being based on a measure of distance between the out-of-gamut target color and its projection onto the actual cone.

19. An apparatus according to claim 18, wherein for in-gamut colors said reproduction LUT stores colorimetrically matched color component values.

20. An apparatus according to claim 18, wherein projection of the out-of-gamut target color is at a slope which varies, the variation in slope being based at least on a difference in luminance between the target color and a crux of the cone-arranged surfaces.

21. An apparatus according to claim 20, wherein projection of the out-of-gamut target color is also based on a slope factor which is varied based on chromatic vertices of the cone-arranged surfaces and hue of the target color.

22. An apparatus according to claim 18, wherein weighting is based on Euclidean distance between the out-of-gamut target color and the target color projected onto the actual cone.

23. An apparatus according to claim 18, wherein weighting is also based on an attenuation factor which is varied based on chromatic vertices of the cone-arranged surfaces and hue of the target color.

24. An apparatus according to claim 18, wherein the color printer driver is stored on a computer readable media.

25. A method for storing color component values into a reproduction look-up table (LUT), the color component values for printing by a color printer in response to commands to print both in-gamut and out-of-gamut colors, the method comprising the steps of:

measuring colors printed by the printer in response to a suitably large number of various combinations of the color component values;

constructing a forward mapping which maps color component values into printed colors;

opening a blank reproduction LUT which, for each of plural different input colors both in-gamut and out-of-gamut, will map the input color to a printable color component value;

testing whether each color in the blank reproduction LUT is in-gamut or out-of-gamut;

for in-gamut colors storing in the blank-reproduction LUT a color component value derived from the forward mapping;

for out-of-gamut colors applying a dual-cone gamut mapping so as to obtain a gamut-mapped color component value, and storing the gamut-mapped color component value into the blank reproduction LUT; and smoothing the reproduction LUT.

26. A method according to claim 25, wherein said step of applying a dual-cone gamut mapping so as to obtain a gamut-mapped color component value further comprises the steps of:

defining an actual cone of N-cone arranged surfaces which mimic an actual gamut of the printer;

defining an ideal cone of M-cone arranged surfaces which mimic an ideal gamut;

projecting the out-of-gamut target color onto the actual cone and de-saturating until an in-gamut color component value is obtained;

projecting the same target color onto the ideal cone so as to obtain a fully-saturated color component value; and obtaining a weighted average of the in-gamut color component value and the fully-saturated color component value, weighting being based on a measure of distance between the out-of-gamut target color and its projection onto the actual cone.

27. A method according to claim 25, wherein for in-gamut colors said reproduction LUT stores colorimetrically matched color component values.

28. A method according to claim 25, wherein projection of the out-of-gamut target color is at a slope which varies, the variation in slope being based at least on a difference in luminance between the target color and a crux of the cone-arranged surfaces.

29. A method according to claim 28, wherein projection of the out-of-gamut target color is also based on a slope factor which is varied based on chromatic vertices of the cone-arranged surfaces and on hue of the target color.

30. A method according to claim 25, wherein weighting is based on Euclidean distance between the out-of-gamut target color and the target color projected onto the actual cone.

31. A method according to claim 30, wherein weighting is also based on an attenuation factor which is varied based on chromatic vertices of the cone-arranged surfaces and on hue of the target color.

32. A method according to claim 25, wherein said step of constructing a forward mapping further comprises the steps of:

applying a white point adjustment to the measured colors;

applying a black point adjustment to the measured colors;

applying a gray axis adjustment to the measured colors; and smoothing the measured colors.

33. A method according to claim 32, wherein said step of smoothing the measured colors comprises the steps of:
   sub-sampling the measured colors; and
   obtaining a weighted average between the measured colors and the sub-sampled colors.

34. A method according to claim 25, wherein said step of smoothing the reproduction LUT comprises the steps of:
   applying local relaxation to the reproduction LUT; and
   applying a local shift.

35. A dual-cone gamut mapping technique for mapping an out-of-gamut target color to color component values printable by a printer, comprising the steps of:
   defining an actual cone of N-cone arranged surfaces which mimic an actual gamut of the printer;
   defining an ideal cone of M-cone arranged surfaces which mimic an ideal gamut;
   projecting the out-of-gamut target color onto the actual cone and de-saturating until an in-gamut color component value is obtained;
   projecting the same target color onto the ideal cone so as to obtain a fully-saturated color component value; and
   obtaining a weighted average of the in-gamut color component value and the fully-saturated color component value, weighting being based on a measure of distance between the out-of-gamut target color and its projection onto the actual cone.

36. A method according to claim 35, wherein projection of the out-of-gamut target color is at a slope which varies, the variation in slope being based at least on a difference in luminance between the target color and a crux of the cone-arranged surfaces.

37. A method according to claim 36, wherein projection of the out-of-gamut target color is also based on a slope factor which is varied based on chromatic vertices of the cone-arranged surfaces and on hue of the target color.

38. A method according to claim 35, wherein weighting is based on Euclidean distance between the out-of-gamut target color and the target color projected onto the actual cone.

39. A method according to claim 38, wherein weighting is also based on an attenuation factor which is varied based on chromatic vertices of the cone-arranged surfaces and on hue of the target color.

* * * * *